US012059120B2

(12) United States Patent
Dai et al.

(10) Patent No.: US 12,059,120 B2
(45) Date of Patent: Aug. 13, 2024

(54) CYCLONIC SEPARATION DEVICE AND APPLICATION THEREOF

(71) Applicants: JIANGSU MIDEA CLEANING APPLIANCES CO., LTD., Suzhou (CN); MIDEA GROUP CO., LTD., Foshan (CN)

(72) Inventors: Jun Dai, Suzhou (CN); Hui Bao, Suzhou (CN); Jie Fang, Suzhou (CN); Donghwy Kang, Suzhou (CN)

(73) Assignees: JIANGSU MIDEA CLEANING APPLIANCES CO., LTD, Suzhou (CN); MIDEA GROUP CO., LTD., Foshan (CN)

( * ) Notice: Subject to any disclaimer, the term of this patent is extended or adjusted under 35 U.S.C. 154(b) by 952 days.

(21) Appl. No.: 16/967,732

(22) PCT Filed: Feb. 1, 2019

(86) PCT No.: PCT/CN2019/074393
§ 371 (c)(1),
(2) Date: Aug. 6, 2020

(87) PCT Pub. No.: WO2019/154314
PCT Pub. Date: Aug. 15, 2019

(65) Prior Publication Data

US 2021/0038036 A1 Feb. 11, 2021

(30) Foreign Application Priority Data

Feb. 7, 2018 (CN) ......................... 201810123258.9
Feb. 7, 2018 (CN) ......................... 201810123264.4
(Continued)

(51) Int. Cl.
*B04C 5/10* (2006.01)
*A47L 9/16* (2006.01)
(Continued)

(52) U.S. Cl.
CPC ........... *A47L 9/1625* (2013.01); *A47L 9/1608* (2013.01); *A47L 9/165* (2013.01); *A47L 9/1658* (2013.01);
(Continued)

(58) Field of Classification Search
CPC .... A47L 9/1608; A47L 9/1625; A47L 9/1633; A47L 9/165; A47L 9/1658; A47L 9/1683;
(Continued)

(56) References Cited

U.S. PATENT DOCUMENTS

2005/0172585 A1* 8/2005 Oh ........................ A47L 9/1641 55/345
2006/0254226 A1 11/2006 Jeon
2016/0000286 A1* 1/2016 Liu ........................ B01D 50/20 55/337

FOREIGN PATENT DOCUMENTS

CN 102283613 A 12/2011
CN 204427939 U * 7/2015
(Continued)

OTHER PUBLICATIONS

CN-204427939-U translation (Year: 2015).*
OA for EP application 19750857.5.
International Search Report of PCT/CN2019/074393.

*Primary Examiner* — Abbie E Quann

(57) ABSTRACT

A cyclonic separation device and a vacuum cleaner including the cyclonic separation device are disclosed. The cyclonic separation device includes a housing and a cyclonic separation device. The cyclonic separation device is provided in the housing to allow dirt in a dust-containing airflow to be separated. The cyclonic separation device includes a first-stage cyclone separator and second-stage cyclone separators located downstream of the first-stage cyclone separator in a flow direction of the airflow. The second-stage cyclone separators surround the first-stage
(Continued)

cyclone separator. The first-stage cyclone separator includes an air guide channel and a first-stage cyclone channel surrounding a part of the air guide channel. The dust-containing airflow enters, from the air guide channel, the first-stage cyclone channel for cyclonic separation and then enters the second-stage cyclone separators again through the air guide channel.

16 Claims, 12 Drawing Sheets

(30) Foreign Application Priority Data

Feb. 7, 2018 (CN) ......................... 201820218241.7
Feb. 7, 2018 (CN) ......................... 201820218242.1

(51) Int. Cl.

| | |
|---|---|
| ***B04C 5/103*** | (2006.01) |
| ***B04C 5/185*** | (2006.01) |
| ***B04C 5/26*** | (2006.01) |
| ***B04C 5/28*** | (2006.01) |
| ***B04C 9/00*** | (2006.01) |

(52) U.S. Cl.
CPC .............. *A47L 9/1683* (2013.01); *B04C 5/10* (2013.01); *B04C 5/103* (2013.01); *B04C 5/185* (2013.01); *B04C 5/26* (2013.01); *B04C 5/28* (2013.01); *B04C 9/00* (2013.01); *B04C 2009/002* (2013.01)

(58) Field of Classification Search
CPC .. B04C 5/10; B04C 5/103; B04C 5/26; B04C 5/28; B04C 9/00; B04C 2009/002; B04C 5/185
USPC ........................................................... 15/347
See application file for complete search history.

(56) References Cited

FOREIGN PATENT DOCUMENTS

| | | | |
|---|---|---|---|
| CN | 204427939 | U | 7/2015 |
| CN | 106861937 | A | 6/2017 |
| CN | 108261145 | A | 7/2018 |
| CN | 108294686 | A | 7/2018 |

* cited by examiner

D-D

E-E

H-H

F-F

G-G

CYCLONIC SEPARATION DEVICE AND APPLICATION THEREOF

CROSS-REFERENCES TO RELATED APPLICATIONS

The present disclosure is a national phase application of International Application No. PCT/CN2019/074393, filed on Feb. 1, 2019, which claims priority to Chinese Patent Application Nos. 201810123258.9, 201820218242.1, 201810123264.4 and 201820218241.7, all filed on Feb. 7, 2018, the entire contents of all of which are incorporated herein by reference.

FIELD

The present disclosure relates to the field of vacuum cleaners, more particularly to a cyclonic separation device and application thereof.

BACKGROUND

At present, vacuum cleaners in the related art have begun to adopt an apparatus with a multi-stage cyclonic separation system consisting of a single first separation device and a plurality of second cyclonic separation devices which include a plurality of second cyclonic separation device. The existing apparatus has some problems, however.

For example, the second-stage separation device is above a dust bucket, and part of its structure is inserted into the first separation device, and it appears to be exposed outside. The structure is complex and highly demanding on sealing performance. A first-stage dust chamber is outside the first separation device, while a second-stage dust chamber is inside the first separation device. As a result, the structure is complex, and it is not easy to disassemble for cleaning. Moreover, the first separation device is bulky, making space available for the first-stage dust chamber small. A mesh cover attached to a surface of the first separation device has many holes and occupies a large area, and the mesh cover is difficult to clean up when clogged by dust during use, which is time-consuming and labor-intensive. There is only one air duct arranged in the middle of the cyclonic structure, and an area for the passage of air is limited, resulting in a small air passage area, large air loss and poor dust collection performance.

In addition, the cyclonic structure of the vacuum cleaner mostly employs a circular separation structure. Under the action of centrifugal forces, heavier dusty air rotates around a center of the circular structure and will be separated and flung out along a side wall of the circular structure, enter the dust chamber and be stored therein. Nevertheless, the separation speed and efficiency are low, and there is room for improvement.

SUMMARY

The present disclosure seeks to solve at least one of the problems existing in the related art. Thus, the present disclosure proposes a cyclonic separation device.

The present disclosure further proposes a vacuum cleaner.

The cyclonic separation device according to embodiments of the present disclosure includes a housing and a cyclonic separation device. The cyclonic separation device is provided in the housing to allow dirt in a dust-laden airflow to be separated. The cyclonic separation device includes a first-stage cyclone separator and a plurality of second-stage cyclone separators located downstream of the first-stage cyclone separator in a flow direction of the airflow. The second-stage cyclone separators surround the first-stage cyclone separator. The first-stage cyclone separator includes an air guide channel and a first-stage cyclone channel surrounding a part of the air guide channel, and the dust-laden airflow enters, from the air guide channel, the first-stage cyclone channel for cyclonic separation and then enters the second-stage cyclone separators again through the air guide channel.

For the cyclonic separation device according to the embodiments of the present disclosure, by providing the first-stage cyclone separator and second-stage cyclone separators, the dust-laden airflow first enters the first-stage cyclone channel through the air guide channel, and then flows into second-stage cyclone separators through the air guide channel, which is beneficial to improving the cyclonic separation effect. Moreover, with second-stage cyclone separators surrounding the first-stage cyclone channel, the arrangement is more reasonable, and the volume of the cyclonic separation device is reduced.

In the cyclonic separation device according to the embodiments of the present disclosure, at least a part of the air guide channel extends linearly, and the first-stage cyclone channel surrounds this part of the air guide channel and extends spirally along a length direction of this part of the air guide channel.

In the cyclonic separation device according to the embodiments of the present disclosure, the air guide channel includes a first air outlet channel and an air inlet channel spaced up and down and coaxially arranged. The first-stage cyclone channel surrounds the first air outlet channel, and in the flow direction of the airflow, the first-stage cyclone channel is located between the air inlet channel and the first air outlet channel. After entering the first-stage cyclone channel through the air inlet channel and experiencing the cyclonic separation, the dust-laden airflow enters the second-stage cyclone separators through the first air outlet channel.

In one embodiment, the first-stage cyclone separator includes: a first cyclone cone having a cavity with an open top; and a separating member provided in the first cyclone cone and defining the first air outlet channel. The first-stage cyclone channel is defined between the separating member and the first cyclone cone, and the separating member is provided with a plurality of through-holes arranged at intervals to make the first air outlet channel communicated with the first-stage cyclone channel.

In one embodiment, a cross-sectional contour line of at least a part of the first cyclone cone is composed of multiple tangent arcs with unequal radii; or a cross-sectional contour line of at least a part of the first cyclone cone forms an ellipse or a circle.

In one embodiment, the first cyclone cone includes a cyclone casing, the cyclone casing has a bottom wall and a side peripheral wall to define the cavity, the bottom wall of the cyclone casing has a mounting hole, and the side peripheral wall exhibits a non-circular cross-sectional shape. The cyclone casing has a guide surface therein, and the guide surface extends spirally upward along a central axis of the mounting hole.

Further, an inner surface of the bottom wall of the first cyclone cone forms at least a part of the guide surface.

Further, the cyclonic separation device further includes an air guiding member. The air guiding member is provided in the cyclone casing and defines, together with the bottom wall of the cyclone casing, a dust-throwing opening in communication with the mounting hole. An upper surface of the air guiding member forms at least a part of the guide surface.

In one embodiment, an outer peripheral edge of the air guiding member is connected to the side peripheral wall of the cyclone casing, and an orthographic projection of an inner peripheral edge of the air guiding member on the bottom wall of the cyclone casing coincides with a hole edge of the mounting hole.

In one embodiment, the air guiding member further has an air-throwing surface, and the air-throwing surface forms an arc surface that gradually extends to the dust-throwing opening from inside to outside along a radial direction of the mounting hole.

Further, the first cyclone cone further includes an air inlet duct. The air inlet duct is connected to a bottom of the cyclone casing and defines the air inlet channel, and the air inlet duct has a cross-sectional area smaller than a cross-sectional area of the cyclone casing.

In one embodiment, the separating member is provided with an air guide partition plate therein to divide an inner cavity of the separating member into an upper part and a lower part. A side wall of the separating member below the air guide partition plate is provided with a vent in communication with the first-stage cyclone channel. The through-holes are provided in a side wall of the air guide partition plate above the air guide partition plate.

In the cyclonic separation device according to the embodiments of the present disclosure, each of the second-stage cyclone separators includes a conical second-stage cyclone channel. After experiencing the cyclonic separation of the first-stage cyclone separator, the airflow enters the second-stage cyclone channels to undergo cyclonic separation again. The air guide channel is located on a center line of the first-stage cyclone separator and second-stage cyclone separators. Each of the second-stage cyclone channels is in communication with the first-stage cyclone channel through an air flow-by channel, and each of the air flow-by channels is tangent to the corresponding second-stage cyclone channel.

In the cyclonic separation device according to the embodiments of the present disclosure, second-stage cyclone separators are arranged on an outer periphery of the first-stage cyclone separator, and a gap is left between each second-stage cyclone separator and the first-stage cyclone separator. A first dust-collecting chamber and a second dust-collecting chamber are defined in a bottom of the housing. The second dust-collecting chamber is spaced apart from the first dust-collecting chamber and is arranged on an outer periphery of the first dust-collecting chamber. The first dust-collecting chamber is configured to receive dirt separated by the first-stage cyclone separator, while the second dust-collecting chamber is configured to receive dirt separated by the second-stage cyclone separators.

Further, second-stage cyclone separators are symmetrically arranged with respect to the first-stage cyclone separator, and at least two second dust-collecting chambers are provided and arranged symmetrically on both opposite sides of the first dust-collecting chamber.

In the cyclonic separation device according to the embodiments of the present disclosure, the cyclonic separation device further includes an air flow-by opening located between the first-stage cyclone separator and second-stage cyclone separators. The second-stage cyclone separators surround the first-stage cyclone separator. After entering the first-stage cyclone channel through the air guide channel and experiencing the cyclonic separation, part of the dust-laden airflow enters the second-stage cyclone separators again through the air guide channel, and another part of the dust-laden airflow enters the second-stage cyclone separators through the air flow-by opening.

Further, the cyclonic separation device further includes an air duct cover plate connected between the first-stage cyclone separator and second-stage cyclone separators, and the air flow-by opening is provided in the air duct cover plate and located on an outer periphery of the air guide channel.

In one embodiment, the air duct cover plate is right opposite to an outlet of the first-stage cyclone channel, and the first-stage cyclone separator, one of second-stage cyclone separators, and the air duct cover plate are integrally formed.

In one embodiment, a filter screen is provided at the air flow-by opening.

In one embodiment, at least two air flow-by openings are provided and located on two opposite sides of the first air outlet channel, and each air flow-by opening is formed in an arc shape extending along a peripheral direction of the first air outlet channel.

In one embodiment, the air flow-by opening is located above the air guide channel or the through holes.

A vacuum according to embodiments of the present disclosure includes the cyclonic separation device according to the embodiments of the present disclosure. By adopting the above cyclonic separation device or dust cup apparatus, the vacuum cleaner has a good dust absorption effect, and users enjoy excellent experience.

Embodiments of the present disclosure will be given in part in the following descriptions, become apparent in part from the following descriptions, or be learned from the practice of the embodiments of the present disclosure.

BRIEF DESCRIPTION OF THE DRAWINGS

Embodiments of the present disclosure will become apparent and more readily appreciated from the following descriptions made with reference to the drawings, in which.

Figure 1:
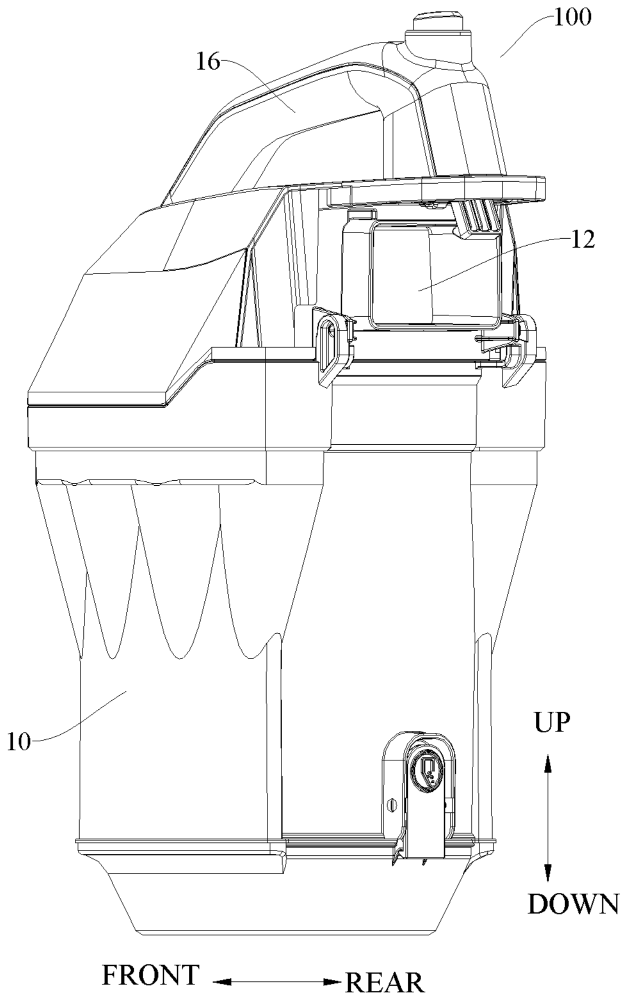
FIG. 1 illustrates a front view of a cyclonic separation device according to an embodiment of the present disclosure.
Figure 2:
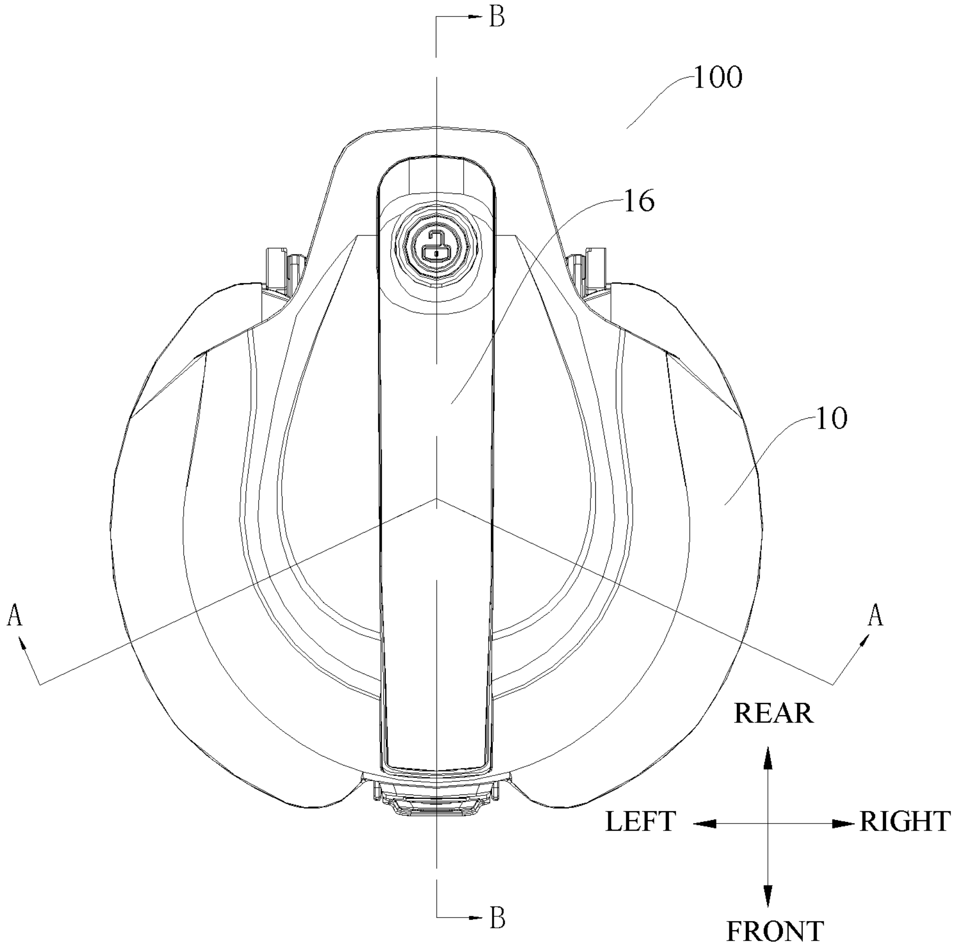
FIG. 2 illustrates a top view of a cyclonic separation device according to an embodiment of the present disclosure.
Figure 3:
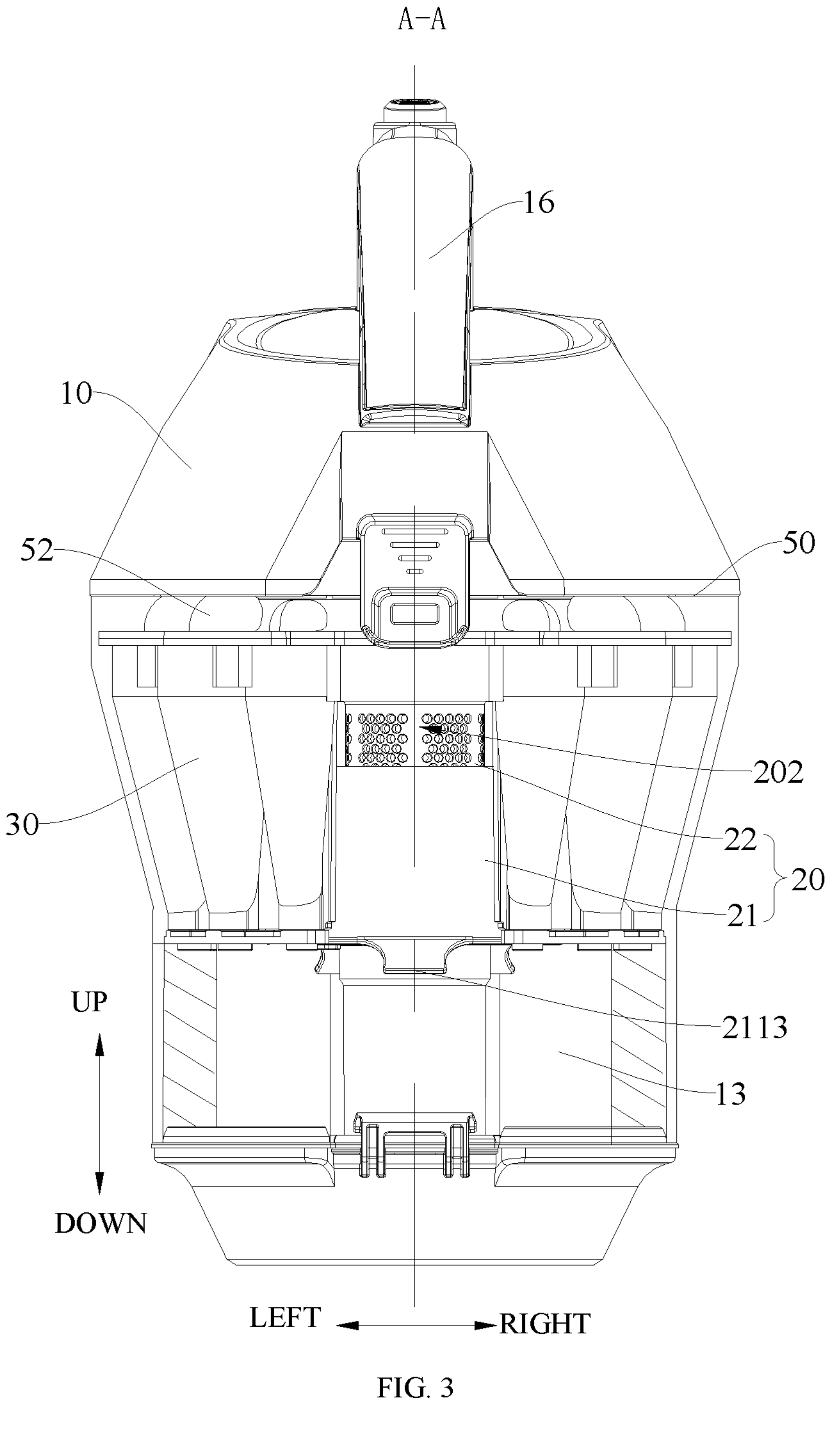
FIG. 3 illustrates a sectional view taken along line A-A in FIG. 2.

REFERENCE NUMERALS cyclonic separation device 100, housing 10, dust inlet 11, air outlet 12, first dust-collecting chamber 13, second dust-collecting chamber 14, dust baffle 15, handle 16, first-stage cyclone separator 20, first-stage cyclone channel 201, first air outlet channel 202, first cyclone cone 21, cyclone casing 211, bottom wall 2111, side peripheral wall 2112, mounting hole 2113, dust-blocking plate 2114, air guiding member 212, dust-throwing opening 2121, air-throwing surface 2122, guide surface 213, air inlet duct 214, separating member 22, air guide partition plate 221, through-hole 222, second-stage cyclone separator 30, second-stage cyclone channel 301, air duct cover plate 40, air flow-by channel 401, air flow-by opening 41, reinforcement rib 42, air outlet cover plate 50, filter 51, air outlet duct, sealing gasket 53.

DETAILED DESCRIPTION OF THE DISCLOSURE

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the specification, it is to be understood that terms such as “central,” “longitudinal,” “transverse,” “length,” “width,” “thickness,” “upper,” “lower,” “front,” “rear,” “left,” “right,” “vertical,” “horizontal,” “top,” “bottom,” “inner,” “outer,” “clockwise,” “counterclockwise,” “axial,” “radial” and “circumferential” should be construed to refer to the orientation as then described or as shown in the drawings under discussion. These relative terms are for convenience of description and do not require that the present disclosure have a particular orientation or be constructed and operated in a particular orientation, and thus cannot be construed to limit the present disclosure. In addition, the feature defined with “first” and “second” may explicitly or implicitly comprise one or more of this feature. In the description of the present disclosure, “a plurality of” means two or more than two, unless specified otherwise.

In the present disclosure, unless specified or limited otherwise, the terms “mounted,” “connected,” “coupled” and the like are used broadly, and may be, for example, fixed connections, detachable connections, or integral connections; may also be mechanical or electrical connections; may also be direct connections or indirect connections via intervening structures; may also be inner communications of two elements.

The cyclonic separation device 100 according to embodiments of the present disclosure will be described below with reference to FIGS. 1 to 14.

As shown in FIGS. 1 to 14, the cyclonic separation device 100 according to embodiments of the present disclosure includes a housing 10 and a cyclonic separation device.

The cyclonic separation device is provided in the housing 10 so that dirt in a dust-laden airflow can be separated. The cyclonic separation device includes a first-stage cyclone separator 20 and a plurality of second-stage cyclone separators 30. The second-stage cyclone separators 30 are located downstream of the first-stage cyclone separator 20 in a flow direction of the airflow and surround the first-stage cyclone separator 20. The first-stage cyclone separator 20 includes an air guide channel and a first-stage cyclone channel 201 surrounding a part of the air guide channel. The dust-laden airflow enters, from the air guide channel, the first-stage cyclone channel 201 for cyclonic separation and then enters second-stage cyclone separators 30 via the air guide channel again.

For the cyclonic separation device 100 according to the embodiments of the present disclosure, by providing the first-stage cyclone separator 20 and second-stage cyclone separators 30, the dust-laden airflow first enters the first-stage cyclone channel 201 through the air guide channel, and then flows into second-stage cyclone separators 30 through the air guide channel, which is beneficial to improving the cyclonic separation effect. Moreover, with second-stage cyclone separators 30 distributed in a peripheral direction of the first-stage cyclone channel 201, the arrangement is more reasonable, and the volume of the cyclonic separation device 100 is reduced.

According to an embodiment of the present disclosure, each second-stage cyclone separator 30 includes a conical second-stage cyclone channel 301. That is, second-stage cyclone separators 30 have a plurality of second-stage cyclone channels 301. After experiencing the cyclonic separation of the first-stage cyclone separator 20, the airflow enters second-stage cyclone channels 301 to undergo cyclonic separation again, achieving the effect of multi-stage cyclonic separation.

Further, second-stage cyclone channels 301 are arranged symmetrically with respect to the first-stage cyclone separator 20, that is, the second-stage cyclone channels 301 are symmetrically arranged on both sides of the first-stage cyclone channel 201, and the dusty air separated from the first-stage cyclone channel 201 can enter the second-stage cyclone channels 301 evenly, improving the separation efficiency.

In one embodiment, a cross-sectional area of each second-stage cyclone channel 301 gradually decreases from top to bottom, which not only boosts the cyclonic separation effect, but also facilitates the arrangement of the second-stage cyclone channels 301 around the first-stage cyclone channel 201, reducing the occupied space and making the cyclonic separation device 100 more beautiful and elegant.

Figure 5:
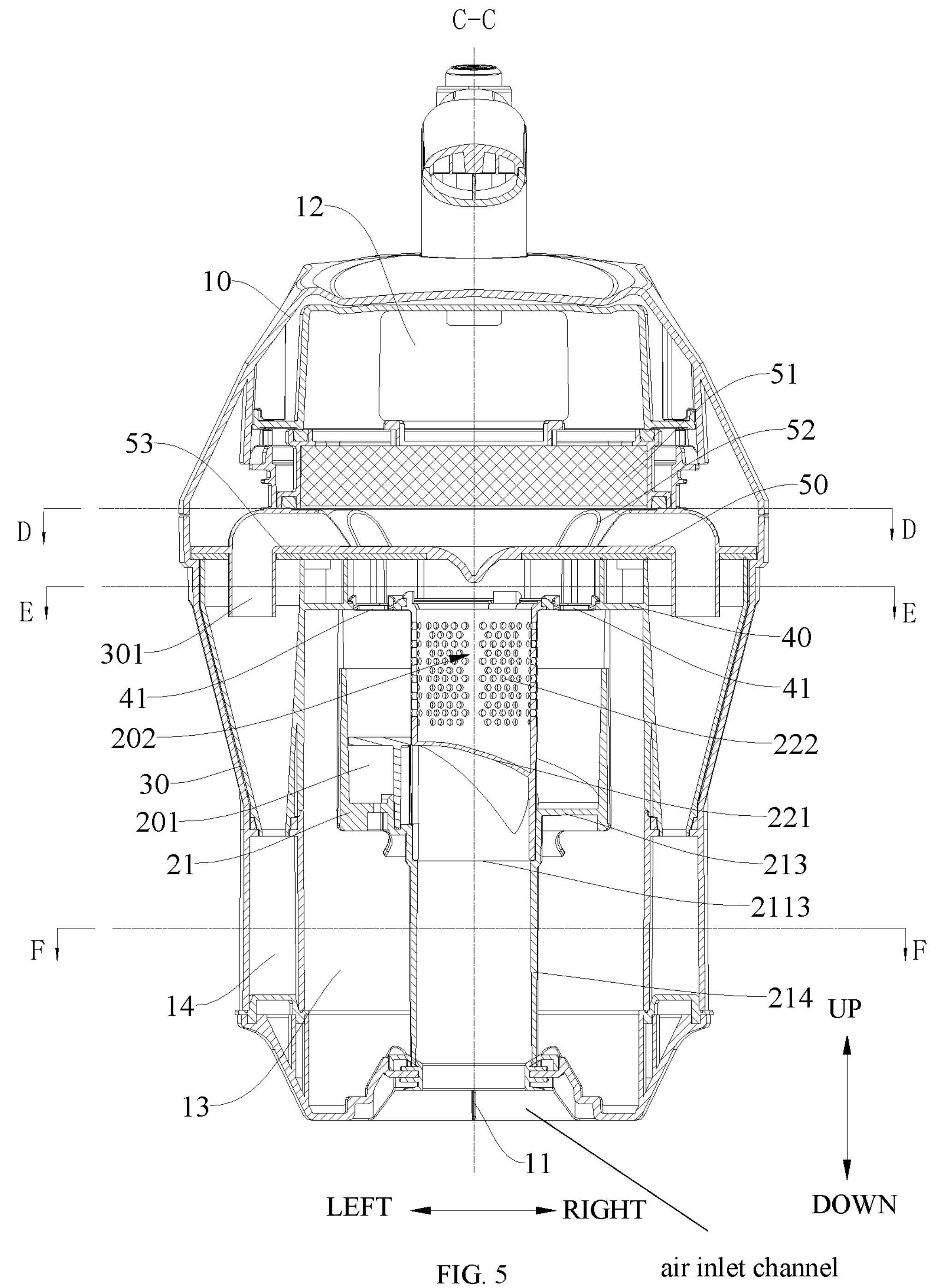
FIG. 5 illustrates a sectional view of an embodiment taken along line C-C in FIG. 4.
Figure 6:
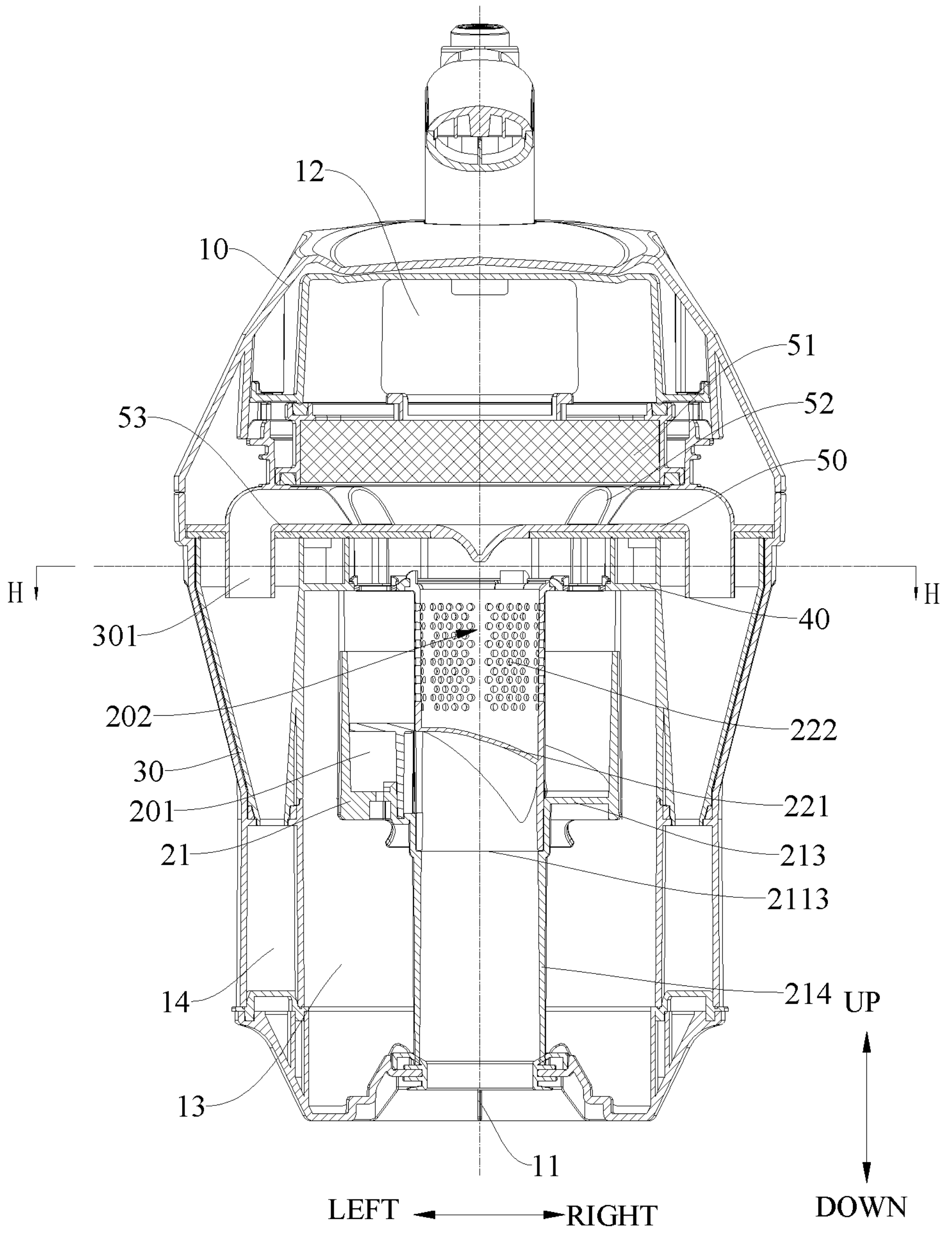
FIG. 6 illustrates a sectional view of another embodiment taken along line C-C in FIG. 4.
Figure 7:
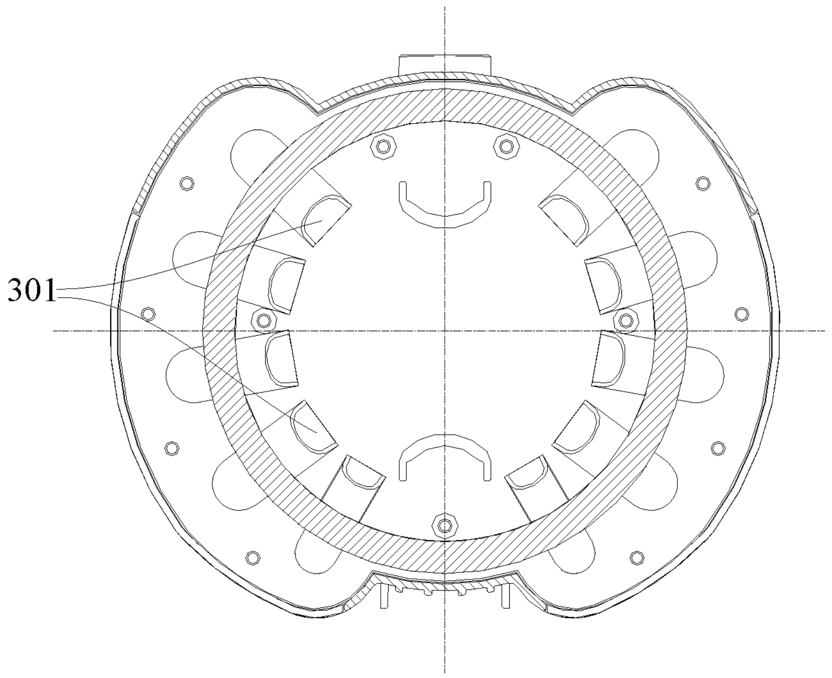
FIG. 7 illustrates a sectional view taken along line D-D in FIG. 5.

According to an embodiment of the present disclosure, at least a part of the air guide channel extends linearly, for example, along an up-down direction in FIG. 5. The first-stage cyclone channel 201 surrounds this part of the air guide channel, and the first-stage cyclone channel 201 extends spirally along a length direction of this part of the air guide channel, so that the dust-laden airflow enters the first-stage cyclone channel 201 and can spirally flow upward, achieving the cyclonic separation effect.

According to a specific embodiment of the present disclosure, the air guide channel includes a first air outlet channel 202 and an air inlet channel. The first air outlet channel 202 and the air inlet channel are spaced up and down and are coaxially arranged. The first-stage cyclone channel 201 surrounds the first air outlet channel 202, and in the flow direction of the airflow, the first-stage cyclone channel 201 is located between the air inlet channel and the first air outlet channel 202. After entering the first-stage cyclone channel 201 through the air inlet channel and experiencing the cyclonic separation, the dust-laden airflow enters second-stage cyclone separators 30 through the first air outlet channel 202, so that the dust-laden airflow that has yet to be separated is further filtered and separated.

The air guide channel is located on a center line of the first-stage cyclone separator 20 and second-stage cyclone separators 30. That is, the center line of the first-stage cyclone separator 20 coincides with the center lines of second-stage cyclone separators 30. The first air outlet channel 202 and the air inlet channel included by the air guide channel are both located in the very center of the first-stage cyclone separator 20 and are both located in the very center of second-stage cyclone separators 30, to ensure the uniformity of the cyclonic separation effect.

In some specific examples, the first air outlet channel 202 extends in the up-down direction, and the first-stage cyclone channel 201 spirally extends upward in an axial direction of the first air outlet channel 202. The axial direction used herein refers to the up-down direction. In the air flow direction, the first air outlet channel 202 is located between the first-stage cyclone channel 201 and the second-stage cyclone channels 301, and the first air outlet channel 202 is communication with the first-stage cyclone channel 201 and the second-stage cyclone channels 301, so that the airflow in the first-stage cyclone channel 201 enters the second-stage cyclone channels 301 through the first air outlet channel 202.

According to an embodiment of the present disclosure, each second-stage cyclone channel 301 is communication with the first-stage cyclone channel 201 through an air flow-by channel 401. Part of the dusty air separated by the first-stage cyclone separator 20 enters the air flow-by channel 401 from the first air outlet channel 202, then enters the second-stage cyclone channel 301, and undergoes secondary separation through second-stage cyclone separators 30. The air flow-by channel 401 is located between the first air outlet channel 202 and the second-stage cyclone channel 301 in the air flow direction. The air flow-by channel 401 may be formed in an irregular shape to make the second-stage cyclone channels 301 completely communicated.

In some examples, each air flow-by channel 401 is tangent to the corresponding second-stage cyclone channel 301. That is, one side of the air flow-by channel 401 is tangent to an outer side of the second-stage cyclone channel 301, so that the air flow-by channel 401 can be smoothly transitioned and connected to the second-stage cyclone channel 301 adjacent to the air flow-by channel 401. The dusty air enters the second-stage cyclone channel 301 along a side wall of the air flow-by channel 401 tangent to the second-stage cyclone channel 301, which can reduce the loss of the airflow and hence improve the separation efficiency.

According to an embodiment of the present disclosure, the first-stage cyclone separator 20 includes a first cyclone cone 21 and a separating member 22. The first cyclone cone 21 has a cavity open at the top to be communicated with a first dust-collecting chamber 13. The separating member 22 is disposed in the first cyclone cone 21 and has the first air outlet channel 202. The first-stage cyclone channel 201 is defined between the separating member 22 and the first cyclone cone 21. The separating member 22 is provided with a plurality of through-holes 222 which are arranged at intervals, and each through-hole 222 is in communication with the first-stage cyclone channel 201 and the first air outlet channel 202.

The dust cyclonically separated by the first-stage cyclone separator 20 is thrown out from a top of the first cyclone cone 21 and falls into the first dust-collecting chamber 13, while the air with a small amount of dust enters the first air outlet channel 202 via the through-holes 222 and flows into second-stage cyclone separators 30 for further treatment.

According to an embodiment of the present disclosure, a cross-sectional contour line of at least a part of the first cyclone cone 21 (such as a cyclone casing 211 described below) is composed of multiple tangent arcs with unequal radii. The dusty air rotates along a side peripheral wall 2112 of the cyclone casing 211 after being thrown out from a dust-throwing opening 2121. Every time the dusty air rotates from a first position on the first cyclone cone 21 where the radius is relatively large to a second position on the first cyclone cone 21 where the radius is relatively small, the centrifugal force is increased and the speed is raised, and the dust will be thrown out at a faster speed and separated from the air. The dusty air continuously rotates along the first-stage cyclone channel 201 and will undergo multiple changes from a large radius to a small radius, which can conduct several times of dust and air separation, accelerate the separation, improve the separation effect, and generate good separation performance.

According to another embodiment of the present disclosure, a cross-sectional contour line of at least a part of the first cyclone cone 21 (such as a cyclone casing 211 described below) forms an ellipse, and the ellipse has a long axis and a short axis perpendicular to each other. When the dusty air rotates along a side peripheral wall 2112 of the first-stage cyclone channel 201, a maximum centrifugal force is obtained when the rotation reaches the short axis, so that the rotation of the dust is accelerated and thrown out at the highest speed, achieving the separation of dust and air.

According to yet another embodiment of the present disclosure, at least a part of the first cyclone cone 21 (such as a cyclone casing 211 described below) has a circular cross-sectional contour line, that is, the cross-sectional contour line of at least a part of the first cyclone cone 21 forms a circle, which simplifies the structure of the first cyclone cone 21, lower the processing and manufacturing difficulties of the first cyclone cone 21, and reduces the production cost. Moreover, the first cyclone cone 21 with a circular cross section can also ensure the cyclonic separation effect.

Figure 13:
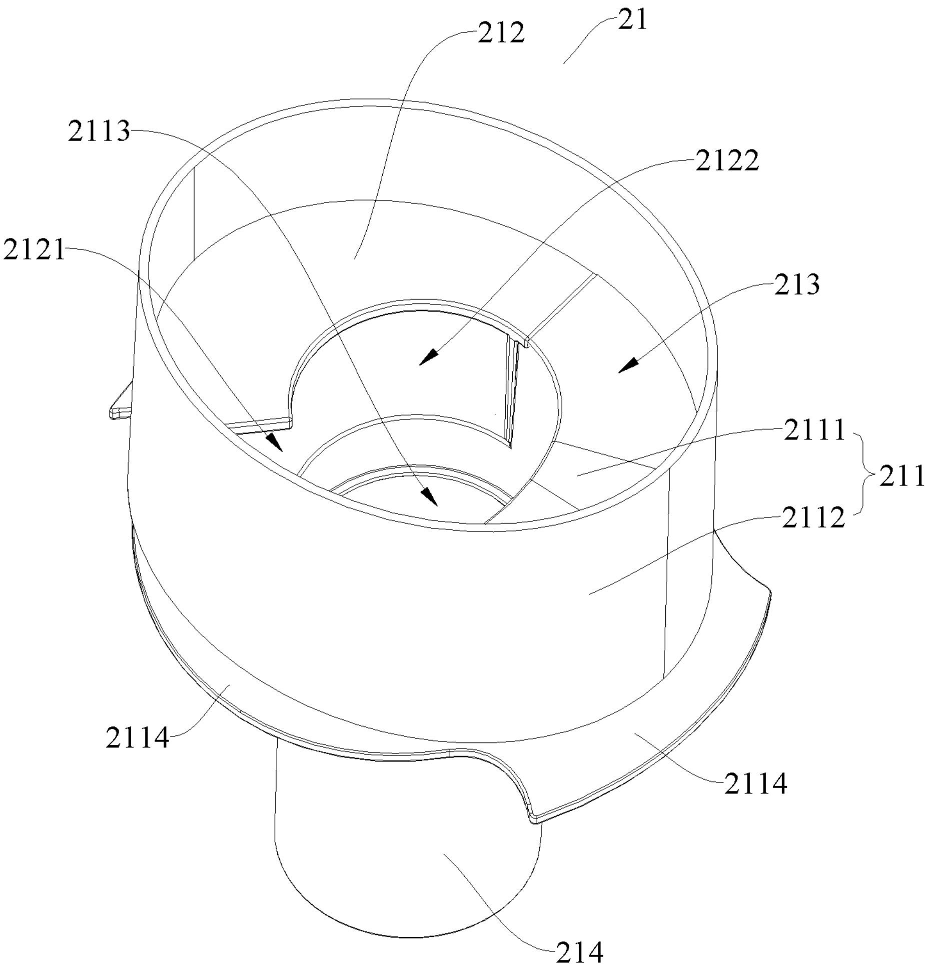
FIG. 13 illustrates a schematic view of a first cyclone cone according to an embodiment of the present disclosure.

As shown in FIG. 13, the first cyclone cone 21 according to an embodiment of the present disclosure includes a cyclone casing 211, and the cyclone casing 211 has a bottom wall 2111 and a side peripheral wall 2112 to define the cavity. The bottom wall 2111 of the cyclone casing 211 has a mounting hole 2113, and the side peripheral wall 2112 has a non-circular cross-sectional shape. The cyclone casing 211 has a guide surface 213 therein, and the guide surface 213 extends spirally upward along a central axis of the mounting hole 2113.

By configuring the cross-sectional shape of the side peripheral wall 2112 of the cyclone casing 211 to be non-circular, and thanks to the characteristics of multiple centers and different radii of the non-circular structure, when the dust-laden airflow spirally moves upward along the side peripheral wall 2112 of the cyclone casing 211 and the guide surface 213, a maximum centrifugal force is obtained when it moves to the smallest radius of the side peripheral wall 2112, accelerating the rotation of garbage and foreign matters, and throwing them out at the highest speed. Thus, the separation speed and the separation efficiency of the first cyclone cone 21 are boosted, that is, the separation performance of the first cyclone cone 21 is upgraded.

According to an embodiment of the present disclosure, an inner surface of the bottom wall 2111 of the first cyclone cone 21 forms at least a part of the guide surface 213. In one embodiment, the bottom wall 2111 of the first cyclone cone 21 forms a volute structure gradually spiraling upward from bottom to top. An upper surface of the volute bottom wall 2111 is a part of the guide surface 213, which can guide the airflow entering the first cyclone cone 21 to an extent. After the dusty air enters the cyclone casing 211, under the guidance of the volute bottom wall 2111, the dust and the air can be better separated, and the structure of the first cyclone cone 21 is simpler and compacter.

According to an embodiment of the present disclosure, the first cyclone cone 21 further includes an air guiding member 212 provided in the cyclone casing 211, and the air guiding member 212 and the bottom wall 2111 of the cyclone casing 211 define the dust-throwing opening 2121 in communication with the mounting hole 2113. An upper surface of the air guiding member 212 forms at least a part of the guide surface 213.

In one embodiment, a first end of the air guiding member 212 is smoothly transitioned and connected to the bottom wall 2111, and the upper surface of the air guiding member 212 forms a fan-shaped guide surface. The dusty air enters the dust-throwing opening 2121 through the mounting hole 2113, and spirally rises under the guidance of the upper surface of the bottom wall 2111. A guidance terminal end of the bottom wall 2111 is connected to the air guiding member 212, and the upper surface of the air guiding member 212 further guides the dusty air, and at the same time separates the dust from the air.

Figure 14:
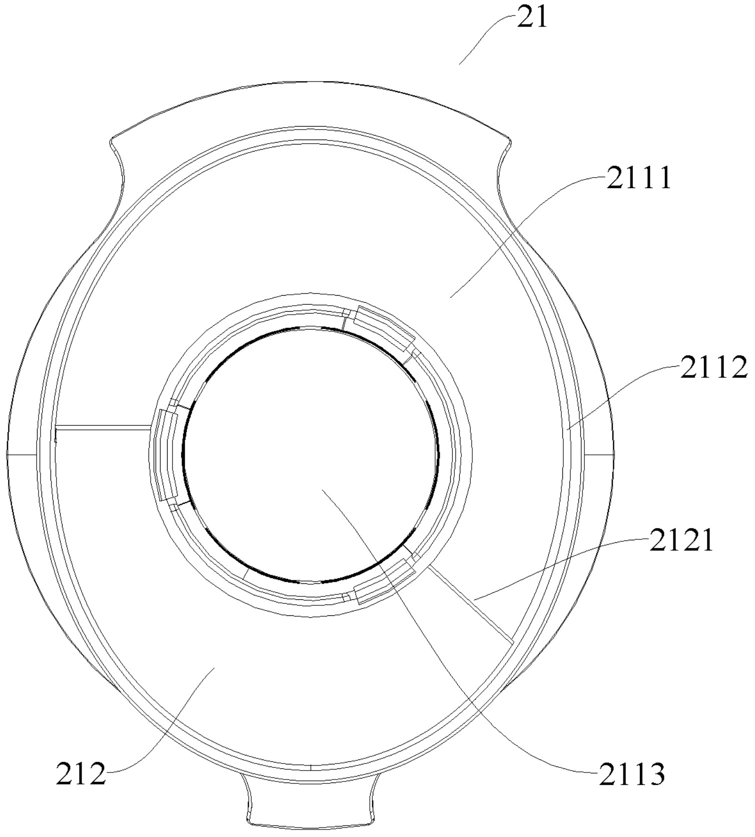
FIG. 14 illustrates a top view of a first cyclone cone according to an embodiment of the present disclosure.

As shown in FIGS. 13 and 14, in some examples, an outer peripheral edge of the air guiding member 212 is connected to the side peripheral wall 2112 of the cyclone casing 211, and an orthographic projection of an inner peripheral edge of the air guiding member 212 on the bottom wall 2111 of the cyclone casing 211 coincides with a hole edge of the mounting hole 2113. The outer peripheral edge herein refers to a peripheral edge of the air guiding member 212 away from the mounting hole 2113, and the inner peripheral edge refers to a peripheral edge of the air guiding member 212 close to the mounting hole 2113. The orthographic projection of the inner peripheral edge coincides with the hole edge of the mounting hole 2113, so that the dusty air in the mounting hole 2113 can smoothly enter the dust-throwing opening 2121, and connection to the separating member 22 described below can be facilitated. The structure is simple and the layout is compact.

It could be understood that the guide surface 213 is formed by the bottom wall 2111 of the cyclone casing 211 and the upper surface of the air guiding member 212 together, and a central angle corresponding to an orthographic projection of an inner peripheral edge of the guide surface 213 on the bottom wall 2111 of the cyclone casing 211 is greater than 360°, and the spiral extension length and area of the guide surface 213 are increased, the separation of dust and air is facilitated, and the dust removal effect is further improved.

In some specific examples, the dust-throwing opening 2121 is located at a position, closest to the center of the mounting hole 2113, on the side peripheral wall 2112 of the cyclone casing 211. That is, a cross-sectional contour line of the side peripheral wall 2112 has a minimum radius at the dust-throwing opening 2121. As a result, when the dusty air rotates to and right above the dust-throwing port 2121, a maximum speed is obtained, achieving the separation of dust and air.

As shown in FIG. 13, in some examples, the air guiding member 212 further has an air-throwing surface 2122, and the air-throwing surface 2122 forms an arc surface that gradually extends to the dust-throwing opening 2121 from inside to outside along a radial direction of the mounting hole 2113. That is, an orthographic projection of the air-throwing surface 2122 on the bottom wall 2111 of the cyclone casing 211 is an arc shape gradually extending obliquely from inside to outside. Due to small resistance of the arc surface, under the guidance of the air-throwing surface 2122, most of the dusty air can enter the dust-throwing opening 2121 from the mounting hole 2113, and then continue to flow along the guide surface 213.

As shown in FIG. 13, according to an embodiment of the present disclosure, a dust-blocking plate 2114 is provided to the side peripheral wall 2112. The dust-blocking plate 2114 obliquely extends towards an outer side gradually from top to bottom. The outer side herein refers to a side of the cyclone casing 211 away from the air guiding member 212. By providing the dust-blocking plate 2114, dust can be guided to an extent, to prevent dust in the first dust-collecting chamber 13 from rising and dust separated by the first-stage cyclone separator 20 from entering the air guide channel.

In some examples, the dust-blocking plate 2114 includes two first dust-blocking portions, and at least two first dust-blocking portions are disposed on opposite sides of the side peripheral wall 2112; or the dust-blocking plate 2114 includes a second dust-blocking portion, and the second dust-blocking portion forms an annular shape extending along a peripheral direction of the first-stage cyclone separator 20; or the dust-blocking plate 2114 includes two first dust-blocking portions and a second dust-blocking portion, and the second dust-blocking portion has a width smaller than that of the first dust-blocking portion. Thus, dust in the first dust-collecting chamber 13 can be prevented from rising.

In some examples, the first cyclone cone 21 further includes an air inlet duct 214 provided below the cyclone casing 211. The air inlet duct 214 defines the air inlet channel, and has a cross-sectional area smaller than a cross-sectional area of the cyclone casing 211. The air inlet duct 214 is in communication with the mounting hole 2113, and the dust enters the mounting hole 2113 through the air inlet duct 214, passes through the dust-throwing opening 2121, and rotates along the guide surface 213. The air inlet duct 214 can be integrally formed with the cyclone casing 211, simplifying the mounting process and improving the mounting efficiency.

In some examples, the air inlet duct 214 is integrally formed with the cyclone casing 211, and an inner diameter of the air inlet duct 214 is slightly smaller than an inner diameter of a lower surface of the cyclone casing 211, so that an annular platform is formed at the connection of the air inlet duct 214 and the cyclone casing 211. The separating member 22 is formed in a tubular shape. A lower end of the separating member 22 is inserted into the mounting hole 2113, and a lower end surface of the separating member 22 abuts against and is connected to the annular platform, so that the air inlet duct 214 plays a role in positioning and supporting the separating member 22.

According to an example of the present disclosure, the separating member 22 is provided with an air guide partition plate 221 therein to divide an inner cavity of the separating member 22 into an upper part and a lower part. A side wall of the separating member 22 below the air guide partition plate 221 is provided with a vent. The vent is in communication with the first-stage cyclone channel 201. The through-holes 222 are provided in a side wall of the air guide partition plate 221 above the air guide partition plate 221. During operation, part of the dusty air that has not been separated in the first-stage cyclone channel 201 can enter the first air outlet channel 202 through the through-holes 222, and then be discharged to the outside or proceed to the next step of treatment.

According to yet another embodiment of the present disclosure, the cyclonic separation device includes a first-stage cyclone separator 20, a plurality of second-stage cyclone separators 30, and an air flow-by opening 41. The air flow-by opening 41 is located in the first-stage cyclone separator 20 and second-stage cyclone separators 30. After entering the first-stage cyclone channel 201 to experience cyclonic separation, part of the dust-laden airflow enters the second-stage cyclone separators 30 through the air guide channel again, and another part thereof enters the second-stage cyclone separators 30 through the air flow-by opening 41.

By providing the air flow-by opening 41, the dusty air discharged from the first-stage cyclone channel 201 can enter second-stage cyclone separators 30 through the air guide channel and the air flow-by opening 41, which enlarges an area for the passage of air, increases the air intake quantity, reduces air loss and thus the loss of wind volume, and improves the cyclonic separation efficiency.

In some specific examples, the air flow-by opening 41 is located on an outer periphery of the first air outlet channel 202, and the air flow-by opening 41 is in communication with the first-stage cyclone channel 201 and the second-stage cyclone channel 301. In the flow direction of the airflow, the first air outlet channel 202 is located between the first-stage cyclone channel 201 and the second-stage cyclone channel 301, and the first air outlet channel 202 is in communication with the first-stage cyclone channel 201 and the second-stage cyclone channel 301, so that the airflow in the first-stage cyclone channel 201 can enter the second-stage cyclone channel 301 through the first air outlet channel 202 and the air flow-by opening 41.

It could be understood that the air flow-by opening 41 is disposed between the first air outlet channel 202 and the air outlet channel 401, and the air flow-by channel 401 is in communication with the air flow-by opening 41, so that part of the airflow that has experienced the cyclonic separation of the first-stage cyclone separator 20 flows into the first air outlet channel 202, and then flows into the air flow-by channel 401 through the air flow-by opening 41, while another part of the airflow that has experienced the cyclonic separation of the first-stage cyclone separator 20 directly enters the air flow-by channel 401 through the air flow-by opening 41. The two parts of airflow merge in the air flow-by channel 401, and finally enters second-stage cyclone separators 30 for further separation, improving the cyclonic separation effect.

According to an embodiment of the present disclosure, the cyclonic separation device further includes an air duct cover plate 40. The air duct cover plate 40 is connected between the first-stage cyclone separator 20 and second-stage cyclone separators 30. In one embodiment, the air duct cover plate 40 is connected to an upper end of the separating member 22, and the duct cover plate 40 extends in a peripheral direction of the separating member 22. That is, the air duct cover plate 40 is formed in an annular shape. An inner peripheral edge of the air duct cover plate 40 is connected to an outer side wall of the upper end of the separating member 22, and an outer peripheral edge of the air duct cover plate 40 is connected to second-stage cyclone separators 30.

In some examples, the air duct cover plate 40 is right opposite to an outlet of the first-stage cyclone channel 201; and one first-stage cyclone separator 20, one of second-stage cyclone separators 30, and the air duct cover plate 40 are integrally formed. The structure thus formed is simpler, which cannot only reduce the connections, but also ensure the stability of the structure.

In one embodiment, the air duct cover plate 40 and the separating member 22 may be formed as an integral piece, or the air duct cover plate 40 and second-stage cyclone separators 30 may be formed as an integral piece, facilitating the assembly or disassembly of the cyclonic separation device 100, and enhancing the stability of the overall structure.

According to an embodiment of the present disclosure, the air flow-by opening 41 is disposed in the air duct cover plate 40, and the air flow-by opening 41 is located on an outer periphery of the air guide channel, making the structure simple and compact.

Figure 8:
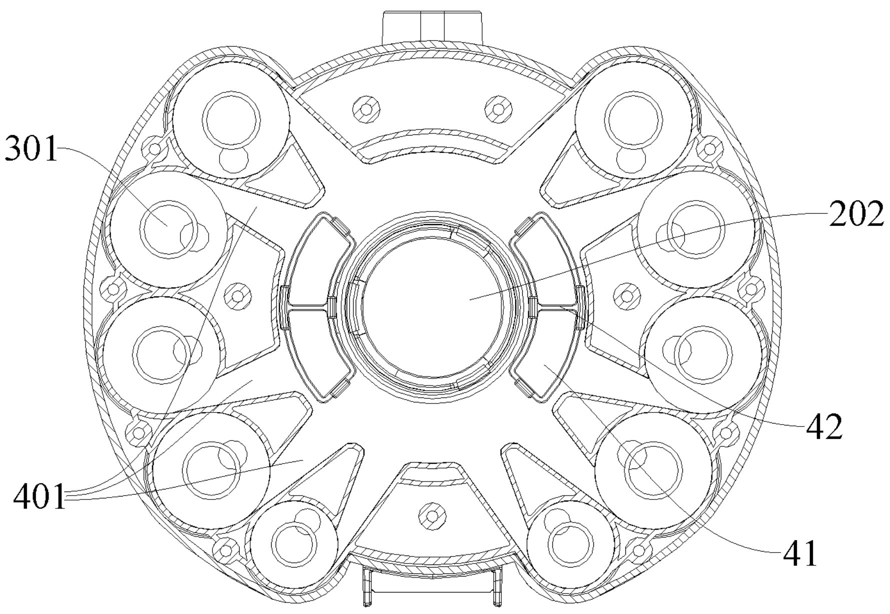
FIG. 8 illustrates a sectional view taken along line E-E in FIG. 5.
Figure 9:
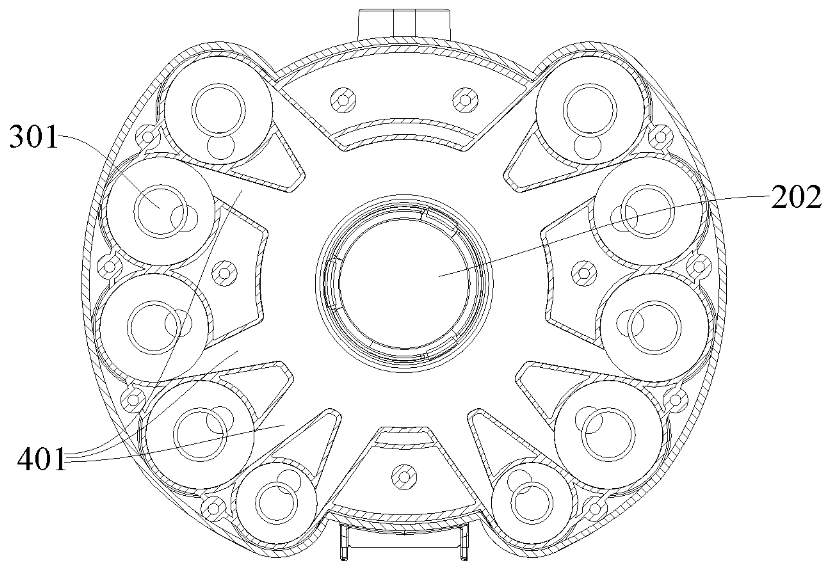
FIG. 9 illustrates a sectional view taken along line H-H in FIG. 6.
Figure 10:
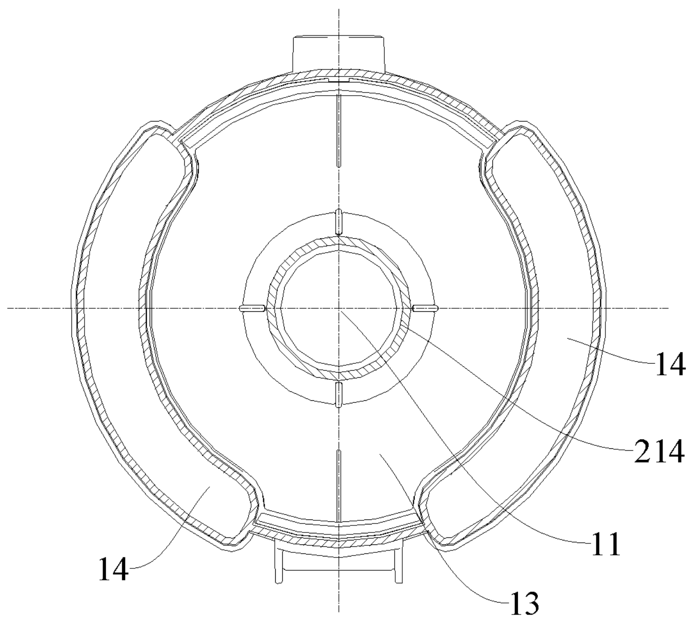
FIG. 10 illustrates a sectional view taken along line F-F in FIG. 5.
Figure 11:
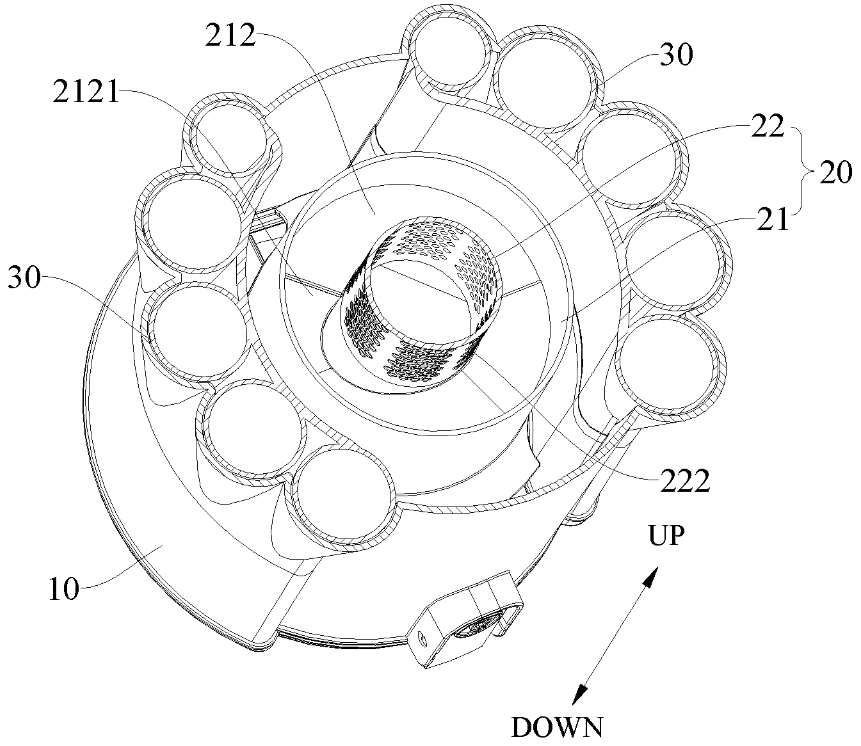
FIG. 11 illustrates a schematic view of a partial structure of a cyclonic separation device according to an embodiment of the present disclosure.
Figure 12:
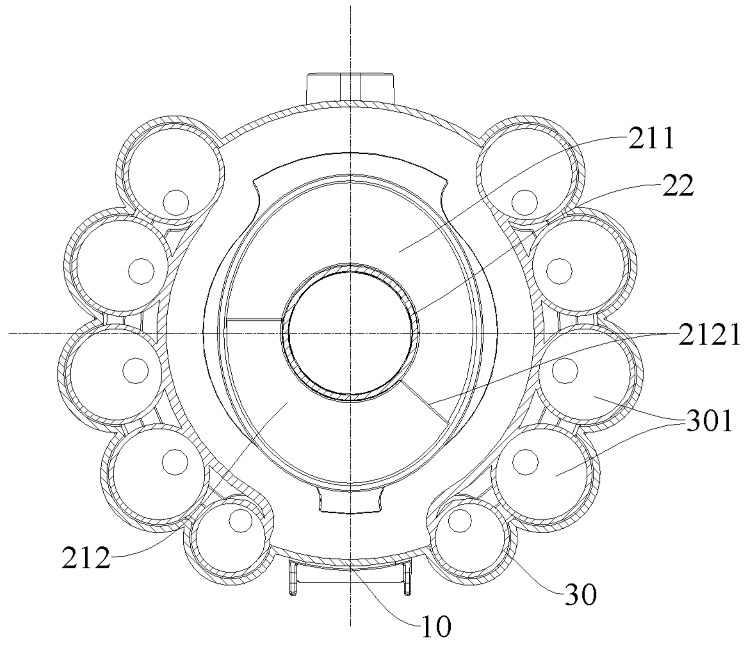
FIG. 12 illustrates a top view of the structure shown in FIG. 11.

As shown in FIGS. 5 and 8, in some examples, the air duct cover plate 40 has at least two air flow-by openings 41, and the at least two air flow-by openings 41 are located on opposite sides of the first air outlet channel 202, to create a form of air outflow from the air outlet channel 202 and of symmetrical air outflow from both sides of the air outlet channel 202. The air outflow is uniform, the air loss is small, and the separation effect is good. Each air flow-by opening 41 is formed in an arc shape extending in the peripheral direction of the separating member 22, and gaps in the air duct cover plate 40 are fully utilized.

Each air flow-by opening 41 forms an arc shape extending along the peripheral direction of the first air outlet channel 202, that is, each air flow-by opening 41 can be arranged in the light of the shape of the air duct cover plate 40, so that gaps in the air duct cover plate 40 can be fully utilized. A reinforcement rib 42 is provided in the middle of each air flow-by opening 41. When the dusty air passes through the air flow-by opening 41, it will have an impact on the air flow-by opening 41. By providing the reinforcement rib 42, the air flow-by opening 41 is prevented from deformation under the impact, and the stability of the air flow-by opening 41 is reinforced.

In one embodiment, the shape and number of the air flow-by openings 41 in the air duct cover plate 40 are not limited to that shown in FIG. 8, and other shapes and quantities can be adopted. Moreover, the air flow-by opening 41 may be provided with other structures to reinforce the structural stability of the air flow-by opening 41.

According to an embodiment of the present disclosure, the first cyclone cone 21 has a cavity with an open top, and the air flow-by opening 41 is located right above the top opening of the cavity; or the air flow-by opening 41 is located above the air guide channel; or the air flow-by opening 41 is located above the through-hole 222 of the separating member 22. Part of the airflow that has experienced the cyclonic separation of the first-stage cyclone separator 20 flows into the first air outlet channel 202 via the through-hole 222, and then enters the air flow-by channel 401 through the air flow-by opening 41. Another part of the airflow that has experienced the cyclonic separation of the first-stage cyclone separator 20 directly enters the air flow-by channel 401 through the air flow-by opening 41. The two parts of airflow merge in the air flow-by channel 401, and finally enters second-stage cyclone separators 30 for further separation, improving the cyclonic separation effect.

According to an embodiment of the present disclosure, a filter screen is provided at the air flow-by opening 41, so that part of the dusty air separated by the first cyclone separator 20 is further filtered, and then discharged to the outside or discharged into the second-stage cyclone channel 301 through the air flow-by opening 41.

According to an embodiment of the present disclosure, second-stage cyclone separators 30 are disposed on an outer periphery of the first-stage cyclone separator 20, and there is a gap left between each second-stage cyclone separator 30 and the first-stage cyclone separator 20. A first dust-collecting chamber 13 and a second dust-collecting chamber 14 are defined in a bottom of the housing 10. The first dust-collecting chamber 13 is spaced apart from the second dust-collecting chamber 14. The first dust-collecting chamber 13 is located in the middle of an interior of the housing 10, and the second dust-collecting chamber 14 is located on an outer periphery of the first dust-collecting chamber 13. The first dust-collecting chamber 13 is used to receive dirt separated by the first-stage cyclone separator 20, and the second dust-collecting chamber 14 is used to receive dirt separated by second-stage cyclone separators 30. The second dust-collecting chamber 14 and the first dust-collecting chamber 13 are mutually independent structures, so that dust can be easily poured out and cleared away.

In some examples, second-stage cyclone separators 30 are arranged symmetrically with respect to the first-stage cyclone separator 20. The housing 10 includes at least two second dust-collecting chambers 14, and the at least two second dust-collecting chambers 14 are symmetrically arranged on two opposite sides of the first dust-collecting chamber 13, so that dirt can be collected and cleared with ease.

It could be understood that the first-stage cyclone separator 20 is located in the center of second-stage cyclone separators 30, and the first-stage cyclone separator 20 is spaced apart from second-stage cyclone separators 30, so that the dust thrown out from the first-stage cyclone channel 201 first falls into the first dust-collecting chamber 13, and another part of the dusty air that has not been separated in the first-stage cyclone channel 201 enters the second-stage cyclone channels 301 of second-stage cyclone separators 30. The air flows from the center of the first-stage cyclone separator 20 to the periphery of the first-stage cyclone separator 20, so that the path along which the airflow is guided into second-stage cyclone separators 30 becomes longer, and hence the separation effect is better.

Further, an axis of symmetry of second-stage cyclone channels 301 may coincide with an axis of symmetry of the two second dust-collecting chambers 14, so that the dust collection effect of the second dust-collecting chambers 14 can be improved, and it is convenient to clean the dust in the dust-collecting chambers. The second dust-collecting chamber 14 and the first dust-collecting chamber 13 are mutually independent structures, so that the dust can be easily poured out and cleared away, and user experience can be upgraded.

In some specific examples, each second dust-collecting chamber 14 forms an arc shape extending along a peripheral direction of the first dust-collecting chamber 13. That is, the second dust-collecting chamber 14 is arranged on the outer periphery of the first dust-collecting chamber 13, making the structure more compact. Thus, the volume of the cyclonic separation device 100 can be reduced and the user experience can be upgraded, without diminishing an internal capacity of the dust-collecting chamber.

In some examples, the housing 10 has a dust inlet 11 and an air outlet 12. The dust inlet 11 is in communication with an inlet of the air guide channel. An outlet of the air guide channel is in communication with inlets of second-stage cyclone separators 30. Outlets of second-stage cyclone separators 30 are in communication with the air outlet 12.

It could be understood that the first-stage cyclone separator 20 is disposed in the housing 10 and has the first-stage cyclone channel 201; the first-stage cyclone channel 201 is located above the first dust-collecting chamber 13 and is in communication with the first dust-collecting chamber 13 and the dust inlet 11; second-stage cyclone separators 30 are disposed in the housing 10 and arranged at intervals along the peripheral direction of the first-stage cyclone channel 201, that is, second-stage cyclone channels 301 are spaced along the peripheral direction of the first-stage cyclone channel 201; each second-stage cyclone channel 301 is located above the second dust-collecting chamber 14 and is in communication with the second dust-collecting chamber 14, the first-stage cyclone channel 201, and the air outlet 12 respectively. That is, each cyclone separator has its own corresponding dust-collecting chamber, which improves the separation efficiency and facilitates cleaning.

Figure 4:
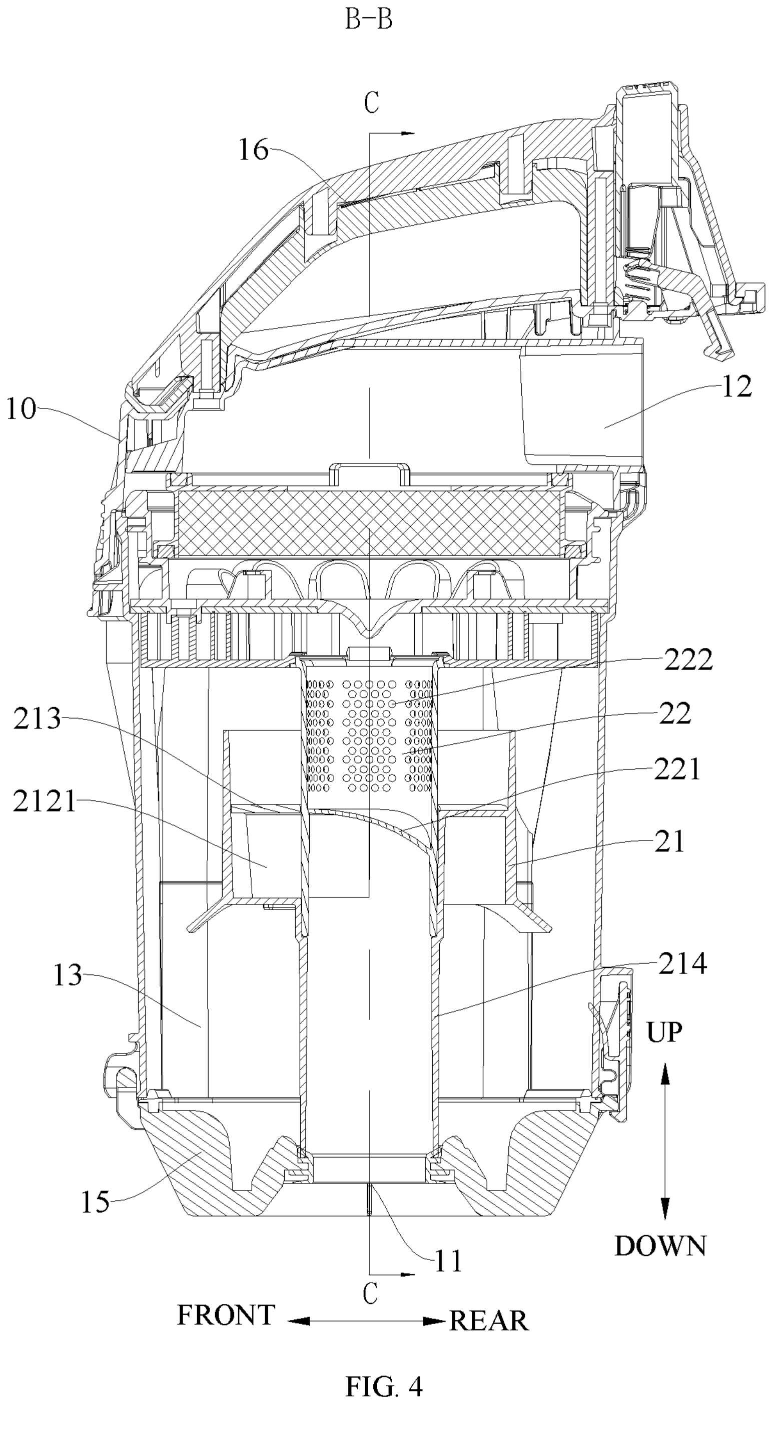
FIG. 4 illustrates a sectional view taken along line B-B in FIG. 2.

As shown in FIGS. 4 and 5, according to an embodiment of the present disclosure, the dust inlet 11 is provided at a bottom (e.g., a lower part shown in FIG. 4) of the housing 10, and the air outlet 12 is provided at a top (e.g., an upper part shown in FIG. 4) of the housing 10. The first-stage cyclone separator 20 and second-stage cyclone separators 30 are all arranged vertically. The second-stage cyclone channels 301 are arranged and evenly spaced around the first-stage cyclone separator 20. The second-stage cyclone channels 301 and the second dust-collecting chamber 14 together are inserted into the housing 10, so that second-stage cyclone channels 301 are located in the peripheral direction of the first-stage cyclone channel 201, and the second dust-collecting chamber 14 is located in the peripheral direction of the first dust-collecting chamber 13. The dusty air enters the cyclonic separation device 100 from the bottom of the housing 10 and experiences the separation of the first-stage cyclone separator 20 and second-stage cyclone separators 30, so that the air with a small density is discharged from the top of the housing 10.

In one embodiment, the position of the dust inlet 11 is not limited to the bottom of the housing 10, but can also be set on a side of the housing 10, to achieve lateral air inflow for a dust cup. The first-stage cyclone separator 20 can also be arranged offset from the vertical direction, so that it is convenient for users to hold and looks good. The second-stage cyclone channels 301 can also be distributed in a discrete manner to make full use of the space in the housing 10. The positions of the first dust-collecting chamber 13 and the second dust-collecting chamber 14 are not limited to the positions shown in FIGS. 5 and 10. It is also possible that the second dust-collecting chamber 14 in another position is inserted into the first dust-collecting chamber 13.

According to an embodiment of the present disclosure, the cyclonic separation device 100 further includes an air outlet cover plate 50. The air outlet cover plate 50 is disposed on tops of the first-stage cyclone separator 20 and second-stage cyclone separators 30. The air outlet cover plate 50 defines the air outlet 12. The air outlet cover plate 50 has a plurality of air outlet ducts 52, and air outlet ducts 52 are in one-to-one correspondence with second-stage cyclone channels 301. At least a part of each air outlet duct 52 is inserted in the corresponding second-stage cyclone channel 301, so that the air separated by the second-stage cyclone channel 301 is discharged to the air outlet 12 through the air outlet duct 52, and the air separated by second-stage cyclone channels 301 will not interfere with each other, raising the discharge efficiency.

In some examples, the air outlet cover plate 50 is hermetically connected to second-stage cyclone separators 30 by a sealing gasket 53. The sealing gasket 53 ensures the sealing performance between the air outlet cover plate 50 and second-stage cyclone separators 30. Because each air outlet duct 52 is inserted in the corresponding second-stage cyclone channel 301, the air separated by second-stage cyclone separators 30 may easily leak out through gaps between the air outlet cover plate 50 and second-stage cyclone separators 30 and fail to reach the air outlet 12. By providing the sealing gasket 53, the above problem can be well avoided.

A dust cup apparatus according to embodiments of the present disclosure includes a filter 51 and the cyclonic separation device 100 according to the embodiments of the present disclosure. The filter 51 is provided at the air outlet 12. In one embodiment, the air separated by the cyclonic separation device 100 is still mixed with some dust, and this part of air is subject to filtration by the filter 51 before reaching the air outlet 12 and is then discharged to the outside, which further improves the dust removal effect.

The dust cup apparatus according to the embodiments of the present disclosure, by adopting the above cyclonic separation device 100, increases the air intake quantity, enlarges the air passage area, reduces the air loss and thus the loss of wind volume, and improves the performance of the dust cup apparatus.

A vacuum cleaner (not shown in the drawings) according to embodiments of the present disclosure includes the cyclonic separation device 100 according to the embodiments of the present disclosure or the dust cup apparatus according to the embodiments of the present disclosure. By adopting the above cyclonic separation device 100 or the dust cup apparatus, the vacuum cleaner enjoys a good dust absorption effect, and the user experience is excellent.

A first specific embodiment of the vacuum cleaner according to the present disclosure will be described below with reference to FIGS. 1-4, 6, 7 and 9-14.

The vacuum cleaner includes a cyclonic separation device 100. The cyclonic separation device 100 includes a housing 10, a first-stage cyclone separator 20, a plurality of second-stage cyclone separators 30, an air duct cover plate 40, and an air outlet cover plate 50.

The housing 10 has a dust inlet 11 and an air outlet 12, the dust inlet 11 is provided at a bottom of the housing 10, and the air outlet 12 is provided at a top of the housing 10. A first dust-collecting chamber 13 and two second dust-collecting chambers 14 are defined in the bottom of the housing 10. The two second dust-collecting chambers 14 are symmetrically distributed on an outer periphery of the first dust-collecting chamber 13. The bottom of the housing 10 is provided with a detachable dust baffle 15, and the dust baffle 15 can be opened to pour dust out. A handle 16 is also provided on the housing 10, for easy pick-and-place and operation by users.

The first-stage cyclone separator 20 and second-stage cyclone separators 30 are disposed in the housing 10. The first-stage cyclone separator 20 is located in the center of second-stage cyclone separators 30, and the first-stage cyclone separator 20 is spaced apart from second-stage cyclone separators 30.

The first-stage cyclone separator 20 has a first-stage cyclone channel 201 and a first air outlet channel 202. The first air outlet channel 202 extends in an up-down direction. The first-stage cyclone channel 201 is located above the first dust-collecting chamber 13, and spirally extends upward along an axial direction of the first air outlet channel 202. The first-stage cyclone channel 201 is in communication with the first dust-collecting chamber 13 and the dust inlet 11.

The first-stage cyclone separator 20 includes a first cyclone cone 21 and a separating member 22.

The first cyclone cone 21 includes a cyclone casing 211, an air inlet duct 214, and an air guiding member 212. The cyclone casing 211 has a bottom wall 2111 and a side peripheral wall 2112, so that a cavity with an open top is defined. A top of the first cyclone cone 21 is in communication with the first dust-collecting chamber 13. The bottom wall 2111 of the cyclone casing 211 has a circular mounting hole 2113, and the side peripheral wall 2112 has a non-circular cross-sectional shape. The cyclone casing 211 has a guide surface 213 therein, and the guide surface 213 extends spirally upward along a central axis of the mounting hole 2113.

In one embodiment, the air guiding member 212 is disposed in the cyclone casing 211, and the guide surface 213 is formed by the bottom wall 2111 of the cyclone casing 211 and an upper surface of the air guiding member 212 together. The air guiding member 212 and the bottom wall 2111 of the cyclone casing 211 define a dust-throwing opening 2121 in communication with the mounting hole 2113. An outer peripheral edge of the air guiding member 212 is connected to the side peripheral wall 2112 of the cyclone casing 211, and an orthographic projection of an inner peripheral edge of the air guiding member 212 on the bottom wall 2111 of the cyclone casing 211 coincides with a hole edge of the mounting hole 2113. The air guiding member 212 further has an air-throwing surface 2122, and the air-throwing surface 2122 forms an arc surface that gradually extends to the dust-throwing opening 2121 from inside to outside along a radial direction of the mounting hole 2113. The air inlet duct 214 is disposed below the cyclone casing 211 and is in communication with the mounting hole 2113. A lower end of the air inlet duct 214 is in communication with the dust inlet 11.

The separating member 22 has the first air outlet channel 202. The first-stage cyclone channel 201 is defined between the separating member 22 and the first cyclone cone 21. A lower end of the separating member 22 is inserted into the first cyclone cone 21. The separating member 22 is provided with an air guide partition plate 221 therein to divide an inner cavity of the separating member 22 into an upper part and a lower part. A side wall of the separating member 22 below the air guide partition plate 221 is provided with a vent. The vent is in communication with the first-stage cyclone channel 201. A side wall of the separating member 22 above the air guide partition plate 221 has a plurality of through-holes 222 arranged at intervals. The first air outlet channel 202 and the first-stage cyclone channel 201 are in communication with each other by means of the through-holes 222.

The second-stage cyclone separators 30 have a plurality of second-stage cyclone channels 301, and second-stage cyclone channels 301 are arranged symmetrically around the first-stage cyclone channel 201. Each second-stage cyclone channel 301 is located above the second dust-collecting chamber 14 at a corresponding position. The second-stage cyclone channels 301 and the second dust-collecting chamber 14 together are inserted into the housing 10. Each second-stage cyclone channel 301 is in communication with the second dust-collecting chamber 14 and the air outlet 12.

The air duct cover plate 40 is formed in an annular shape. An inner peripheral edge of the air duct cover plate 40 is connected to an upper end of the separating member 22, and an outer peripheral edge of the air duct cover plate 40 is connected to second-stage cyclone separators 30. The air duct cover plate 40 is integrally formed with the separating member 22 and second-stage cyclone separators 30. The first cyclone cone 21 is arranged below the air duct cover plate 40 and spaced apart from the air duct cover plate 40.

The air outlet cover plate 50 defines the air outlet 12, and a filter 51 is provided at the air outlet 12. The air outlet cover plate 50 has a plurality of air outlet ducts 52, and air outlet ducts 52 are in one-to-one correspondence with the plurality of second-stage cyclone channels 301. At least a part of each air outlet duct 52 is inserted in the corresponding second-stage cyclone channel 301. Respective upper ends of second-stage cyclone separators 30 are hermetically connected to the air outlet cover plate 50 through a sealing gasket 53.

When the vacuum cleaner is in use, the dusty air enters the air inlet duct 214 through the dust inlet 11 in the cyclonic separation device 100, and the first-stage cyclone separator 20 works. The airflow enters the dust-throwing opening 2121 along the mounting hole 2113 of the cyclone casing 211. Then the dusty air rotates along the guide surface 213 into the first-stage cyclone channel 201. When the dusty air rotates from a first position on the side wall 2112 where a radius of the side wall 2122 is relatively large to a second position on the side wall 2112 where its radius is relatively small, the centrifugal force is increased and the speed is raised, so that large particles of impurities and dust are separated and thrown out under the action of the centrifugal force and gravity, enter the first dust-collecting chamber 13, and are deposited at the bottom of the first dust-collecting chamber 13. The dust that has not been separated by the first cyclone cone 21 enters the first air outlet channel 202 through the through-holes 222, and along with the rise of the airflow, enters the air flow-by channel 401 as well. Then, the dust enters the second-stage cyclone channels 301 through the air flow-by channel 401. Under the action of the centrifugal force and gravity, most of the dust enters the second dust-collecting chamber 14 through the second-stage cyclone channel 301, and the airflow with a small amount of tiny dust reaches the air outlet 12 through the air outlet duct 52 and is further filtered by the filter 51 at the air outlet 12. Finally, clean air is discharged to the outside.

When there is a lot of dust in the first dust-collecting chamber 13 and the second dust-collecting chamber 14, the dust baffle 15 at the bottom of the housing 10 is removed, so that the dust in the first dust-collecting chamber 13 and the second dust-collecting chamber 14 can be poured out.

A second specific embodiment of the vacuum cleaner according to the present disclosure will be described below with reference to FIGS. 1-5, 7, 8 and 10-14.

The vacuum cleaner includes a cyclonic separation device 100. The cyclonic separation device 100 includes a housing 10, a first-stage cyclone separator 20, a plurality of second-stage cyclone separators 30, an air duct cover plate 40, and an air outlet cover plate 50.

The housing 10 has a dust inlet 11 and an air outlet 12, the dust inlet 11 is provided at a bottom of the housing 10, and the air outlet 12 is provided at a top of the housing 10. A first dust-collecting chamber 13 and two second dust-collecting chambers 14 are defined in the bottom of the housing 10. The two second dust-collecting chambers 14 are symmetrically distributed on an outer periphery of the first dust-collecting chamber 13. The bottom of the housing 10 is provided with a detachable dust baffle 15, and the dust baffle 15 can be opened to pour dust out. A handle 16 is also provided on the housing 10, for easy pick-and-place and operation by users.

The first-stage cyclone separator 20 and second-stage cyclone separators 30 are disposed in the housing 10. The first-stage cyclone separator 20 is located in the center of second-stage cyclone separators 30, and the first-stage cyclone separator 20 is spaced apart from second-stage cyclone separators 30.

The first-stage cyclone separator 20 has a first-stage cyclone channel 201 and a first air outlet channel 202. The first air outlet channel 202 extends in an up-down direction. The first-stage cyclone channel 201 is located above the first dust-collecting chamber 13, and spirally extends upward along an axial direction of the first air outlet channel 202. The first-stage cyclone channel 201 is in communication with the first dust-collecting chamber 13 and the dust inlet 11.

The first-stage cyclone separator 20 includes a first cyclone cone 21 and a separating member 22.

The first cyclone cone 21 includes a cyclone casing 211, an air inlet duct 214, and an air guiding member 212. The cyclone casing 211 has a bottom wall 2111 and a side peripheral wall 2112, so that a cavity with an open top is defined. A top of the first cyclone cone 21 is in communication with the first dust-collecting chamber 13. The bottom wall 2111 of the cyclone casing 211 has a circular mounting hole 2113, and the side peripheral wall 2112 has an oval cross-sectional shape. The cyclone casing 211 has a guide surface 213 therein, and the guide surface 213 extends spirally upward along a central axis of the mounting hole 2113.

In one embodiment, the air guiding member 212 is disposed in the cyclone casing 211, and the guide surface 213 is formed by the bottom wall 2111 of the cyclone casing 211 and an upper surface of the air guiding member 212 together. The air guiding member 212 and the bottom wall 2111 of the cyclone casing 211 define a dust-throwing opening 2121 in communication with the mounting hole 2113. An outer peripheral edge of the air guiding member 212 is connected to the side peripheral wall 2112 of the cyclone casing 211, and an orthographic projection of an inner peripheral edge of the air guiding member 212 on the bottom wall 2111 of the cyclone casing 211 coincides with a hole edge of the mounting hole 2113. The air guiding member 212 further has an air-throwing surface 2122, and the air-throwing surface 2122 forms an arc surface that gradually extends to the dust-throwing opening 2121 from inside to outside along a radial direction of the mounting hole 2113. The air inlet duct 214 is disposed below the cyclone casing 211 and is in communication with the mounting hole 2113. A lower end of the air inlet duct 214 is in communication with the dust inlet 11.

The separating member 22 defines the first air outlet channel 202. The first-stage cyclone channel 201 is defined between the separating member 22 and the first cyclone cone 21. A lower end of the separating member 22 is inserted into the first cyclone cone 21. The separating member 22 is provided with an air guide partition plate 221 therein to divide an inner cavity of the separating member 22 into an upper part and a lower part. A side wall of the separating member 22 below the air guide partition plate 221 is provided with a vent. The vent is in communication with the first-stage cyclone channel 201. A side wall of the separating member 22 above the air guide partition plate 221 has a plurality of through-holes 222 arranged at intervals. The first air outlet channel 202 and the first-stage cyclone channel 201 are in communication with each other by means of the through-holes 222.

The second-stage cyclone separators 30 have a corresponding plurality of second-stage cyclone channels 301, and second-stage cyclone channels 301 are arranged symmetrically around the first-stage cyclone channel 201. Each second-stage cyclone channel 301 is located above the second dust-collecting chamber 14 at a corresponding position. The second-stage cyclone channels 301 and the second dust-collecting chamber 14 together are inserted into the housing 10. Each second-stage cyclone channel 301 is in communication with the second dust-collecting chamber 14 and the air outlet 12.

The air duct cover plate 40 is formed in an annular shape. An inner peripheral edge of the air duct cover plate 40 is connected to an upper end of the separating member 22, and an outer peripheral edge of the air duct cover plate 40 is connected to second-stage cyclone separators 30. The air duct cover plate 40 is integrally formed with second-stage cyclone separators 30. The air duct cover plate 40 has two air flow-by openings 41, and the two air flow-by openings 41 are located on opposite sides of the first air outlet channel 202. Each air flow-by opening 41 is formed in an arc shape extending in a peripheral direction of the separating member 22. A reinforcement rib 42 is provided in the middle of each air flow-by opening 41. A filter screen is provided at the air flow-by opening 41. The air flow-by opening 41 is in communication with the first-stage cyclone channel 201 and the second-stage cyclone channel 301. The first cyclone cone 21 is arranged below the air duct cover plate 40 and spaced apart from the air duct cover plate 40.

The air outlet cover plate 50 defines the air outlet 12, and a filter 51 is provided at the air outlet 12. The air outlet cover plate 50 has a plurality of air outlet ducts 52, and air outlet ducts 52 are in one-to-one correspondence with second-stage cyclone channels 301. At least a part of each air outlet duct 52 is inserted in the corresponding second-stage cyclone channel 301. Respective upper ends of second-stage cyclone separators 30 are hermetically connected to the air outlet cover plate 50 through a sealing gasket 53.

When the vacuum cleaner is in use, the dusty air enters the air inlet duct 214 through the dust inlet 11 in the cyclonic separation device 100, and the first-stage cyclone separator 20 works. The airflow enters the dust-throwing opening 2121 along the mounting hole 2113 of the cyclone casing 211. Then the dusty air rotates along the guide surface 213 into the first-stage cyclone channel 201. When the dusty air rotates from a first position on the side wall 2112 where a radius of the side wall 2122 is relatively large to a second position on the side wall 2112 where its radius is relatively small, the centrifugal force is increased and the speed is raised, so that large particles of impurities and dust are separated and thrown out under the action of the centrifugal force and gravity, enter the first dust-collecting chamber 13, and are deposited at the bottom of the first dust-collecting chamber 13. Then, part of the tiny dust that has not been separated by the first cyclone cone 21 enters the air flow-by channel 401 through the air flow-by opening 41, while another part of the tiny dust is separated to the first air outlet channel 202 via the through-holes 222 and also enters the air flow-by channel 401 along with the rise of the airflow. The airflow in the air flow-by channel 401 enters the second-stage cyclone channels 301. Under the action of the centrifugal force and gravity, most of the dust enters the second dust-collecting chamber 14 through the second-stage cyclone channel 301, and the airflow with a small amount of tiny dust reaches the air outlet 12 through the air outlet duct 52 and is further filtered by the filter 51 at the air outlet 12. Finally, clean air is discharged to the outside.

When there is a lot of dust in the first dust-collecting chamber 13 and the second dust-collecting chamber 14, the dust baffle 15 at the bottom of the housing 10 is removed, so that the dust in the first dust-collecting chamber 13 and the second dust-collecting chamber 14 can be poured out.

Another cyclonic separation device 100 for a vacuum cleaner according to an embodiment of the present disclosure will be described with reference to FIGS. 15 and 16.

Figure 15:
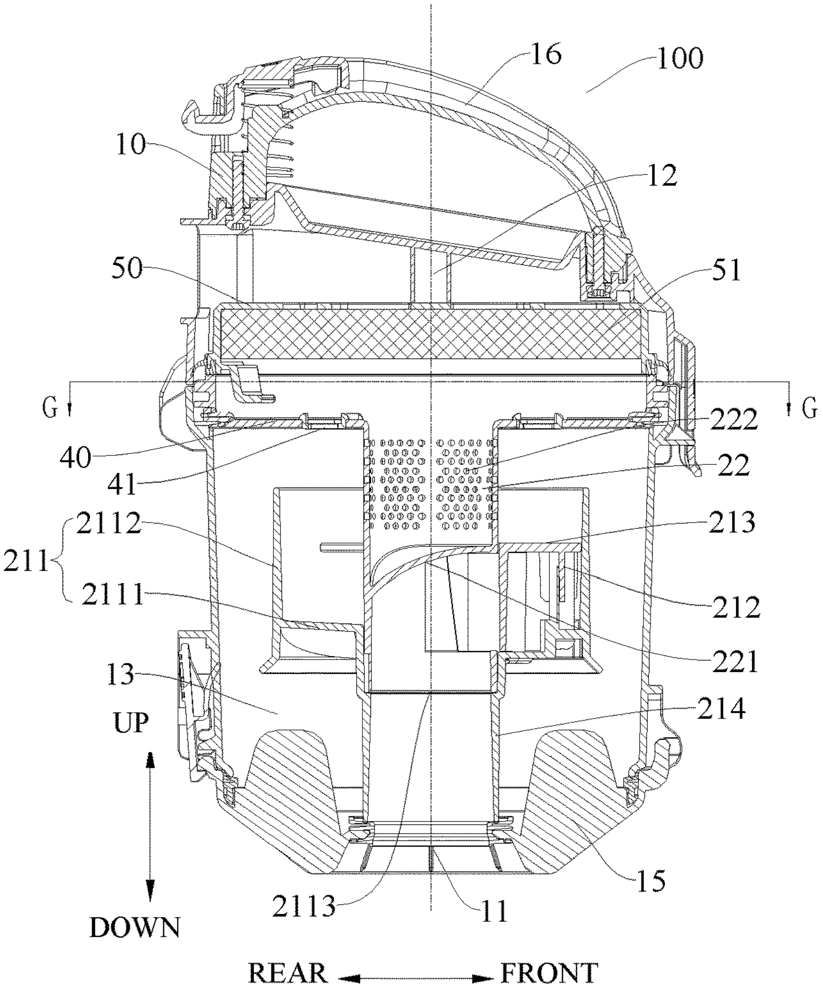
FIG. 15 illustrates a schematic view of a cyclonic separation device according to another embodiment of the present disclosure.
Figure 16:
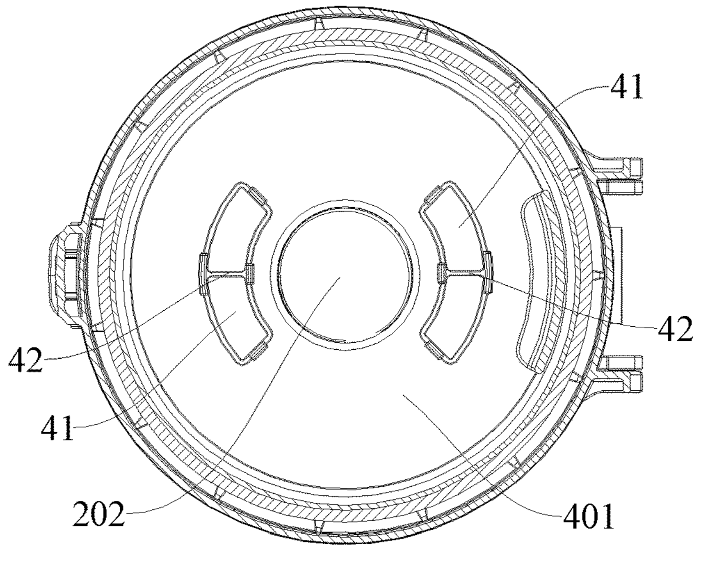
FIG. 16 illustrates a sectional view taken along line G-G in FIG. 15.

As shown in FIGS. 15 and 16, the cyclonic separation device 100 according to the embodiment of the present disclosure includes: a housing 10, a first-stage cyclone separator 20, and an air duct cover plate 40.

The housing 10 has a dust inlet 11 and an air outlet 12. The first-stage cyclone separator 20 is provided in the housing 10. The first-stage cyclone separator 20 has a first-stage cyclone channel 201 and a first air outlet channel 202. The first-stage cyclone channel 201 and the first air outlet channel 202 are communicated with each other. The first air outlet channel 202 is located in the middle of the housing 10 and is in communication with the air outlet 12. The first-stage cyclone channel 201 spirally extends upwards along an axial direction of the air outlet channel 202 and is in communication with the dust inlet 11. The air duct cover plate 40 is arranged above the first-stage cyclone separator 20 and has an air flow-by opening 41. The air flow-by opening 41 is in communication with the first-stage cyclone channel 201 and the air outlet 12.

For the cyclonic separation device 100 according to the embodiment of the present disclosure, by providing the air flow-by opening 41 in the air duct cover plate 40, the dusty air can be discharged through the first air outlet channel 202 and the air flow-by opening 41, which enlarges the area for the passage of air, increases the air intake quantity, reduces air loss and thus the loss of wind volume, and improves the cyclonic separation efficiency.

According to an embodiment of the present disclosure, the first-stage cyclone separator 20 includes a first cyclone cone 21 and a separating member 22. The first cyclone cone 21 is arranged below the air duct cover plate 40 and spaced apart from the air duct cover plate 40. The first cyclone cone 21 has a cavity with an open top, and the separating member 22 is arranged in the first cyclone cone 21. The separating member 22 has the first air outlet channel 202, and the first-stage cyclone channel 201 is defined between the separating member 22 and the first cyclone cone 21.

In some examples, the separating member 22 is formed in a tubular shape, and a side wall of the separating member 22 is provided with a plurality of through-holes 222 arranged at intervals. Each through-hole 222 is in communication with the first-stage cyclone channel 201 and the first air outlet channel 202. One end of the separating member 22 is inserted into the first cyclone cone 21.

In some specific examples, the first-stage cyclone separator 20 includes an air inlet duct 214 and a cyclone casing 211. An inner diameter of the air inlet duct 214 is slightly smaller than an inner diameter of a lower surface of the cyclone casing 211, so that an annular platform is formed at the connection of the air inlet duct 214 and the cyclone casing 211. A lower end surface of the separating member 22 abuts against and is connected to the annular platform, so that the air inlet duct 214 plays a role in positioning and supporting the separating member 22.

In some specific examples, the separating member 22 is provided with an air guide partition plate 221 therein to divide an inner cavity of the separating member 22 into an upper part and a lower part. The air guide partition plate 221 may be formed as a curved plate. A side wall of the separating member 22 below the air guide partition plate 221 is provided with a vent. The vent is in communication with the first-stage cyclone channel 201. The through-holes 222 are provided in a side wall of the air guide partition plate 221 above the air guide partition plate 221. Part of the dusty air that has not been separated in the first-stage cyclone channel 201 can enter the first air outlet channel 202 through the through-holes 222, and then be discharged to the outside or proceed to the next step of treatment.

As shown in FIGS. 15 and 16, in some examples, the air duct cover plate 40 is connected to an upper end of the separating member 22 and extends in a peripheral direction of the separating member 22. That is, the air duct cover plate 40 is formed in an annular shape. An inner peripheral edge of the air duct cover plate 40 is connected to the upper end of the separating member 22, and an outer peripheral edge of the air duct cover plate 40 is connected to the housing 10.

In one embodiment, the air duct cover plate 40 and the separating member 22 may be formed as an integral piece, facilitating the assembly or disassembly of the cyclonic separation device 100, and enhancing the stability of the overall structure.

According to an embodiment of the present disclosure, the air duct cover plate 40 includes at least two air flow-by openings 41, and the at least two air flow-by openings 41 are located on opposite sides of the first air outlet channel 202, to create a form of air outflow from the air outlet channel 202 and of symmetrical air outflow from both sides of the air outlet channel 202. The air outflow is uniform, the air loss is small, and the separation effect is good. Each air flow-by opening 41 is formed in an arc shape extending in the peripheral direction of the separating member 22, and gaps in the air duct cover plate 40 are fully utilized.

As shown in FIG. 16, according to an embodiment of the present disclosure, the air duct cover plate 40 has two air flow-by openings 41. Each air flow-by opening 41 forms an arc shape extending along the peripheral direction of the separating member 22, that is, each air flow-by opening 41 can be arranged in the light of the shape of the air duct cover plate 40, so that gaps in the air duct cover plate 40 can be fully utilized. A reinforcement rib 42 is provided in the middle of each air flow-by opening 41. When the dusty air passes through the air flow-by opening 41, it will have an impact on the air flow-by opening 41. By providing the reinforcement rib 42, the air flow-by opening 41 is prevented from deformation under the impact, and the stability of the air flow-by opening 41 is reinforced.

In one embodiment, the shape and number of the air flow-by openings 41 in the air duct cover plate 40 are not limited to that shown in FIG. 16, and other shapes and quantities can be adopted. Moreover, the air flow-by opening 41 may be provided with other structures to reinforce the structural stability of the air flow-by opening 41.

According to an embodiment of the present disclosure, the housing 10 has a first dust-collecting chamber 13 in the housing and at the bottom of the housing 10. The first dust-collecting chamber 13 is located below the first-stage cyclone channel 201. The first dust-collecting chamber 13 is in communication with the first-stage cyclone channel 201. The dusty air rotates in the first-stage cyclone channel 201, and the first dust-collecting chamber 13 can receive the dust after cyclonic separation.

As shown in FIGS. 1-12, in some examples, the cyclonic separation device 100 further includes a second cyclone cone. The first cyclone cone 21 and the second cyclone cone work together to improve the dust removal effect of the cyclonic separation device 100. The second cyclone cone is provided in the housing 10. The second cyclone cone has a second-stage cyclone channel 301. The second-stage cyclone channel 301 is in communication with the first air outlet channel 202 and the air flow-by opening 41 by means of the air flow-by channel 401. In a flow direction of the airflow, the second-stage cyclone channel 301 is located between the air outlet 12 and the air flow-by channel 401.

During operation, part of the dusty air that has not been separated in the first-stage cyclone channel 201 can enter the first air outlet channel 202 through the through-holes 222, and then be discharged to the outside or proceed to the next step of treatment. Another part of the dusty air that has not been separated enters the air flow-by channel 401 through the air flow-by opening 41 and then enters the second-stage cyclone channel 301. The dusty air enters the second-stage cyclone channel 301 in two ways, increasing the amount of air entering the second-stage cyclone channel 301, reducing the air intake loss, and enhancing the suction power of the cyclonic separation device 100.

In some examples, a filter screen is provided at the air flow-by opening 41, so that part of the dusty air separated by the first cyclone separator 20 is further filtered, and then discharged to the outside or discharged into the second-stage cyclone channel 301 through the air flow-by opening 41.

In some specific examples, the cyclonic separation device 100 includes a plurality of second cyclone cones. The second cyclone cones are arranged on an outer periphery of the first cyclone cone 21 along a peripheral direction of the first cyclone cone 21, and the outer periphery refers to an outer side of the first cyclone cone 21, i.e., being arranged along the peripheral direction of the first cyclone cone 21. By providing second cyclone cones, the dust removal effect can be further improved.

In some examples, the housing 10 has a second dust-collecting chamber 14 in the housing and at the bottom of the housing 10. The second dust-collecting chamber 14 is arranged on an outer periphery of the first dust-collecting chamber 13. The second dust-collecting chamber 14 is located below the second-stage cyclone channel 301 and is in communication with the second-stage cyclone channel 301. The dusty air rotates in the second-stage cyclone channel 301, and the second dust-collecting chamber 14 can receive the dust after cyclonic separation. The second dust-collecting chamber 14 and the first dust-collecting chamber 13 are mutually independent structures, so that dust can be easily poured out and cleared away.

In some specific examples, the housing 10 includes at least two second dust-collecting chambers 14, and the at least two second dust-collecting chambers 14 are symmetrically arranged on two opposite sides of the first dust-collecting chamber 13. Moreover, an axis of symmetry of second-stage cyclone channels 301 may coincide with an axis of symmetry of the two second dust-collecting chambers 14, so that the dust collection effect can be improved, and it is convenient to clean the dust in the dust-collecting chambers.

Further, each second dust-collecting chamber 14 forms an arc shape extending along a peripheral direction of the first dust-collecting chamber 13. That is, the second dust-collecting chamber 14 is arranged on the outer periphery of the first dust-collecting chamber 13, making the structure more compact. Thus, the volume of the cyclonic separation device 100 can be reduced and the user experience can be upgraded, without diminishing an internal capacity of the dust-collecting chamber.

A specific embodiment of the vacuum cleaner according to the present disclosure will be described below.

As shown in FIGS. 15 and 16, the vacuum cleaner includes a cyclonic separation device 100. The cyclonic separation device 100 includes a housing 10, a first-stage cyclone separator 20, an air duct cover plate 40, and an air outlet cover plate 50.

The housing 10 has a dust inlet 11 and an air outlet 12, the dust inlet 11 is provided at a bottom of the housing 10, and the air outlet 12 is provided at a top of the housing 10. A first dust-collecting chamber 13 is defined in the bottom of the housing 10. The bottom of the housing 10 is provided with a detachable dust baffle 15, and the dust baffle 15 can be opened to pour dust out. A handle 16 is provided above the housing 10, for easy pick-and-place and operation by users.

The first-stage cyclone separator 20 is disposed in the housing 10. The first-stage cyclone separator 20 has a first-stage cyclone channel 201 and a first air outlet channel 202. The first air outlet channel 202 extends in an up-down direction. The first-stage cyclone channel 201 is located above the first dust-collecting chamber 13, and spirally extends upward along an axial direction of the first air outlet channel 202. The first-stage cyclone channel 201 is in communication with the first dust-collecting chamber 13 and the dust inlet 11.

The first-stage cyclone separator 20 includes a first cyclone cone 21 and a separating member 22.

The first cyclone cone 21 includes a cyclone casing 211, an air inlet duct 214, and an air guiding member 212. The cyclone casing 211 has a bottom wall 2111 and a side peripheral wall 2112, so that a cavity with an open top is defined. A top of the first cyclone cone 21 is in communication with the first dust-collecting chamber 13. The bottom wall 2111 of the cyclone casing 211 has a circular mounting hole 2113, and the side peripheral wall 2112 has a non-circular cross-sectional shape. The cyclone casing 211 has a guide surface 213 therein, and the guide surface 213 extends spirally upward along a central axis of the mounting hole 2113.

In one embodiment, the air guiding member 212 is disposed in the cyclone casing 211, and the guide surface 213 is formed by the bottom wall 2111 of the cyclone casing 211 and an upper surface of the air guiding member 212 together. The air guiding member 212 and the bottom wall 2111 of the cyclone casing 211 define a dust-throwing opening 2121 in communication with the mounting hole 2113. An outer peripheral edge of the air guiding member 212 is connected to the side peripheral wall 2112 of the cyclone casing 211, and an orthographic projection of an inner peripheral edge of the air guiding member 212 on the bottom wall 2111 of the cyclone casing 211 coincides with a hole edge of the mounting hole 2113. The air guiding member 212 further has an air-throwing surface 2122, and the air-throwing surface 2122 forms an arc surface that gradually extends to the dust-throwing opening 2121 from inside to outside along a radial direction of the mounting hole 2113. The air inlet duct 214 is disposed below the cyclone casing 211 and is in communication with the mounting hole 2113. A lower end of the air inlet duct 214 is in communication with the dust inlet 11.

A dust-blocking plate 2114 is provided to the side peripheral wall 2112 of the first-stage cyclone separator 20. The dust-blocking plate 2114 obliquely extends towards an outer side gradually from top to bottom. That is, the dust-blocking plate 2114 obliquely extends towards a side of the cyclone casing 211 away from the air guiding member 212. In one embodiment, the dust-blocking plate 2114 includes two first dust-blocking portions and a second dust-blocking portion. The two first dust-blocking portions are disposed on opposite sides of the side peripheral wall 2112. The second dust-blocking portion forms an annular shape extending along a peripheral direction of the first-stage cyclone separator 20, and the second dust-blocking portion has a width smaller than that of the first dust-blocking portion. Thus, dust in the first dust-collecting chamber 13 can be prevented from rising.

The separating member 22 defines the first air outlet channel 202. The first-stage cyclone channel 201 is defined between the separating member 22 and the first cyclone cone 21. A lower end of the separating member 22 is inserted into the first cyclone cone 21. The separating member 22 is provided with an air guide partition plate 221 therein to divide an inner cavity of the separating member 22 into an upper part and a lower part. A side wall of the separating member 22 below the air guide partition plate 221 is provided with a vent. The vent is in communication with the first-stage cyclone channel 201. A side wall of the separating member 22 above the air guide partition plate 221 has a plurality of through-holes 222 arranged at intervals. The first air outlet channel 202 and the first-stage cyclone channel 201 are in communication with each other by means of the through-holes 222.

The air duct cover plate 40 is formed in an annular shape. An inner peripheral edge of the air duct cover plate 40 is connected to an upper end of the separating member 22, and an outer peripheral edge of the air duct cover plate 40 is connected to the housing 10. The air duct cover plate 40 is integrally formed with the separating member 22. The air duct cover plate 40 has two air flow-by openings 41, and the two air flow-by openings 41 are located on opposite sides of the first air outlet channel 202. Each air flow-by opening 41 is formed in an arc shape extending in a peripheral direction of the separating member 22. A reinforcement rib 42 is provided in the middle of each air flow-by opening 41. The air flow-by opening 41 is in communication with the first-stage cyclone channel 201. The first cyclone cone 21 is arranged below the air duct cover plate 40 and spaced apart from the air duct cover plate 40.

The air outlet cover plate 50 defines the air outlet 12, and a filter 51 is provided at the air outlet 12.

When the vacuum cleaner is in use, the dusty air enters the air inlet duct 214 through the dust inlet 11 in the cyclonic separation device 100, and the first-stage cyclone separator 20 works. The airflow enters the dust-throwing opening 2121 along the mounting hole 2113 of the cyclone casing 211. Then the dusty air rotates along the guide surface 213 into the first-stage cyclone channel 201. When the dusty air rotates from a first position on the side wall 2112 of the cyclone casing 211 where a radius of the side wall 2122 is relatively large to a second position where the radius of the side wall 2112 is relatively small, the centrifugal force is increased and the speed is raised, so that large particles of impurities and dust are separated and thrown out under the action of the centrifugal force and gravity, enter the first dust-collecting chamber 13, and are deposited at the bottom of the first dust-collecting chamber 13. Then, part of the tiny dust that has not been separated by the first cyclone cone 21 enters the air flow-by channel 401 through the air flow-by opening 41, while another part of the tiny dust is separated to the first air outlet channel 202 via the through-holes 222 and also enters the air flow-by channel 401 along with the rise of the airflow. The filter 51 at the air outlet 12 further filters the dusty air in the air flow-by channel 401. Finally, clean air is discharged to the outside.

When there is a lot of dust in the first dust-collecting chamber 13 and the second dust-collecting chamber 14, the dust baffle 15 at the bottom of the housing 10 is removed, so that the dust in the first dust-collecting chamber 13 and the second dust-collecting chamber 14 can be poured out.

Other configurations and operations of the vacuum cleaner according to the embodiments of the present disclosure are known and will not be described in detail here.

Reference throughout this specification to "an embodiment," "some embodiments," "an exemplary embodiment" "an example," "a specific example," or "some examples" means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A cyclonic separator, comprising:

a housing; and a cyclonic separation device provided in the housing to allow dirt in a dust-laden airflow to be separated, the cyclonic separation device comprising a first-stage cyclone separator and a plurality of second-stage cyclone separators located downstream of the first-stage cyclone separator in a flow direction of airflow, the plurality of second-stage cyclone separators surrounding the first-stage cyclone separator; wherein the first-stage cyclone separator comprises an air guide channel and a first-stage cyclone channel surrounding a part of the air guide channel, and the dust-laden airflow enters, from the air guide channel, the first-stage cyclone channel for cyclonic separation and then enters the second-stage cyclone separators through the air guide channel;

the air guide channel comprises a first air outlet channel and an air inlet channel spaced up and down and coaxially arranged, the first-stage cyclone channel surrounds the first air outlet channel, and in the flow direction of the airflow, the first-stage cyclone channel is located between the air inlet channel and the first air outlet channel; and after entering the first-stage cyclone channel through the air inlet channel and experiencing the cyclonic separation, the dust-laden airflow enters the second-stage cyclone separators through the first air outlet channel;

wherein the first-stage cyclone separator comprises:

a first cyclone with a tapered wall and having a cavity with an open top; and a separating member provided in the first cyclone and defining the first air outlet channel; wherein the first-stage cyclone channel is defined between the separating member and the first cyclone, and the separating member is provided with a plurality of through-holes arranged at intervals to make the first air outlet channel communicated with the first-stage cyclone channel;

The at least part of the air guide channel extends linearly, and the first-stage cyclone channel extends spirally along a length direction of the at least part of the air guide channel;

the cyclonic separation device further comprises an air flow-by opening located between the first-stage cyclone separator and the plurality of second-stage cyclone separators, and the plurality of second-stage cyclone separators surround the first-stage cyclone separator; and after entering the first-stage cyclone channel through the air guide channel and experiencing the cyclonic separation, part of the dust-laden airflow enters the second-stage cyclone separators through the air guide channel, and another part of the dust-laden airflow enters the second-stage cyclone separators through the air flow-by opening, wherein a filter screen is provided at the air flow-by opening.

2. The cyclonic separator according to claim 1, wherein a cross-sectional contour line of at least a part of the first cyclone is composed of multiple tangent arcs with unequal radii; or a cross-sectional contour line of at least a part of the first cyclone forms an ellipse or a circle.

3. The cyclonic separator according to claim 1, wherein the first cyclone comprises a cyclone casing, the cyclone casing has a bottom wall and a side peripheral wall to define the cavity, the bottom wall of the cyclone casing has a mounting hole, and the side peripheral wall exhibits a curved cross-sectional shape, wherein the cyclone casing has a guide surface therein, and the guide surface extends spirally upward along a central axis of the mounting hole.

4. The cyclonic separator according to claim 3, wherein an inner surface of the bottom wall of the first cyclone forms at least a part of the guide surface.

5. The cyclonic separator according to claim 3, further comprising:

an air guiding member provided in the cyclone casing, and defining, together with the bottom wall of the cyclone casing, a dust-throwing opening in communication with the mounting hole, an upper surface of the air guiding member forming at least a part of the guide surface.

6. The cyclonic separator according to claim 5, wherein an outer peripheral edge of the air guiding member is connected to the side peripheral wall of the cyclone casing, and an orthographic projection of an inner peripheral edge of the air guiding member on the bottom wall of the cyclone casing coincides with a hole edge of the mounting hole.

7. The cyclonic separator according to claim 5, wherein the air guiding member further has an air-throw deflection surface, and the air-throw deflection surface forms an arc surface gradually extending to the dust-throwing.

8. The cyclonic separator according to claim 1, wherein the first cyclone further comprises an air inlet duct, the air inlet duct is connected to a bottom of a cyclone casing and defines the air inlet channel, and the air inlet duct has a cross-sectional area smaller than a cross-sectional area of the cyclone casing.

9. The cyclonic separator according to claim 1, wherein the separating member is provided with an air guide partition plate therein to divide an inner cavity of the separating member into an upper part and a lower part, a side wall of the separating member below the air guide partition plate is provided with a vent in communication with the first-stage cyclone channel, and the plurality of through-holes are provided in the side wall of the separating member above the air guide partition plate.

10. The cyclonic separator according to claim 1, wherein each of the second-stage cyclone separators comprises a conical second-stage cyclone channel, and after experiencing the cyclonic separation of the first-stage cyclone separator, the airflow enters the conical second-stage cyclone channels to undergo cyclonic separation again, wherein the air guide channel is located on a center line of the first-stage cyclone separator and the plurality of second-stage cyclone separators, wherein each of the conical second-stage cyclone channels is in communication with the first-stage cyclone channel through an air flow-by channel, and each of the air flow-by channels is tangent to a corresponding conical second-stage cyclone channel.

11. The cyclonic separator according to claim 1, wherein the plurality of second-stage cyclone separators are arranged on an outer periphery of the first-stage cyclone separator, and a gap is left between each said second-stage cyclone separator and the first-stage cyclone separator, a first dust-collecting chamber and a second dust-collecting chamber are defined in a bottom of the housing, the second dust-collecting chamber is spaced apart from the first dust-collecting chamber and is arranged on an outer periphery of the first dust-collecting chamber, and the first dust-collecting chamber is configured to receive dirt separated by the first-stage cyclone separator, while the second dust-collecting chamber is configured to receive dirt separated by the second-stage cyclone separators, wherein the plurality of second-stage cyclone separators are symmetrically arranged with respect to the first-stage cyclone separator, and at least two second dust-collecting chambers are provided and arranged symmetrically on both opposite sides of the first dust-collecting chamber.

12. The cyclonic separator according to claim 1, wherein the cyclonic separation device further comprises an air duct cover plate connected between the first-stage cyclone separator and the plurality of second-stage cyclone separators, and the air flow-by opening is provided in the air duct cover plate and located on an outer periphery of the air guide channel.

13. The cyclonic separator according to claim 12, wherein the air duct cover plate is right opposite to an outlet of the first-stage cyclone channel; and the first-stage cyclone separator, one of the plurality of second-stage cyclone separators, and the air duct cover plate are integrally formed.

14. The cyclonic separator according to claim 1, wherein the air flow-by opening comprises at least two air flow-by openings and are provided and located on opposite sides of the first air outlet channel, and each of the air flow-by openings are formed in an arc shape extending along a peripheral direction of the first air outlet channel.

15. The cyclonic separator according to claim 1, wherein the air flow-by opening is located above the air guide channel or through holes.

16. A vacuum cleaner, comprising:

a cyclonic separator, comprising:

a housing; and a cyclonic separation device provided in the housing to allow dirt in a dust-laden airflow to be separated, the cyclonic separation device comprising a first-stage cyclone separator and a plurality of second-stage cyclone separators located downstream of the first-stage cyclone separator in a flow direction of the airflow, the plurality of second-stage cyclone separators surrounding the first-stage cyclone separator; wherein the first-stage cyclone separator comprises an air guide channel and a first-stage cyclone channel surrounding a part of the air guide channel, and the dust-laden airflow enters, from the air guide channel, the first-stage cyclone channel for cyclonic separation and then enters the second-stage cyclone separators through the air guide channel;

the air guide channel comprises a first air outlet channel and an air inlet channel spaced up and down and coaxially arranged, the first-stage cyclone channel surrounds the first air outlet channel, and in the flow direction of the airflow, the first-stage cyclone channel is located between the air inlet channel and the first air outlet channel; and after entering the first-stage cyclone channel through the air inlet channel and experiencing the cyclonic separation, the dust-laden airflow enters the second-stage cyclone separators through the first air outlet channel;

wherein the first-stage cyclone separator comprises:

a first cyclone with a tapered wall and having a cavity with an open top; and a separating member provided in the first cyclone and defining the first air outlet channel; wherein the first-stage cyclone channel is defined between the separating member and the first cyclone, and the separating member is provided with a plurality of through-holes arranged at intervals to make the first air outlet channel communicated with the first-stage cyclone channel;

the at least part of the air guide channel extends linearly, and the first-stage cyclone channel extends spirally along a length direction of the at least part of the air guide channel;

the cyclonic separation device further comprises an air flow-by opening located between the first-stage cyclone separator and the plurality of second-stage cyclone separators, and the plurality of second-stage cyclone separators surround the first-stage cyclone separator; and after entering the first-stage cyclone channel through the air guide channel and experiencing the cyclonic separation, part of the dust-laden airflow enters the second-stage cyclone separators through the air guide channel, and another part of the dust-laden airflow enters the second-stage cyclone separators through the air flow-by opening, wherein a filter screen is provided at the air flow-by opening.

* * * * *